(12) United States Patent
Cuk et al.

(10) Patent No.: US 7,778,046 B1
(45) Date of Patent: Aug. 17, 2010

(54) VOLTAGE STEP-UP SWITCHING DC-TO-DC CONVERTER FIELD OF THE INVENTION

(76) Inventors: Slobodan Cuk, 35 Tesla, Suite #350, Irvine, CA (US) 92618; Zhe Zhang, 9 San Ambrosio, Rancho Santa Margarita, CA (US) 92688

( * ) Notice: Subject to any disclaimer, the term of this patent is extended or adjusted under 35 U.S.C. 154(b) by 0 days.

(21) Appl. No.: 12/317,009

(22) Filed: Dec. 17, 2008

(51) Int. Cl.
*H02M 3/335* (2006.01)
(52) U.S. Cl. .......................... 363/16; 323/222; 323/284
(58) Field of Classification Search .................. 363/16; 323/222, 225, 282, 284, 288
See application file for complete search history.

(56) References Cited

U.S. PATENT DOCUMENTS

| | | | |
|---|---|---|---|
| 4,184,197 A | 1/1980 | Cuk et al. | |
| 4,257,087 A | 3/1981 | Cuk | |
| 6,388,896 B1 * | 5/2002 | Cuk | 363/16 |
| 6,400,579 B2 * | 6/2002 | Cuk | 363/16 |
| 7,332,897 B2 * | 2/2008 | Lee et al. | 323/222 |

\* cited by examiner

*Primary Examiner*—Jessica Han

(57) ABSTRACT

A non-isolated and isolated both polarity non-inverting and polarity inverting switching DC-to-DC converters with three switches are provided with a basic voltage step-up DC gain characteristics and a very efficient operation without a danger of voltage overstress of any of the three switches over the full operating range from duty ratio of 0 to 1.0, thus resulting in wide input voltage operating range. The isolated extensions feature transformer with no DC-bias for efficient operation and small size. Full-bridge secondary side implementation further reduces the output filtering requirements.

19 Claims, 34 Drawing Sheets

VOLTAGE STEP-UP SWITCHING DC-TO-DC CONVERTER FIELD OF THE INVENTION

FIELD OF THE INVENTION

The non-isolated switching DC-to-DC converters can be broadly divided into three basic categories based on their input to output DC voltage conversion characteristics: a) step-down only (buck converter), step-up only (boost converter) and step down/step-up (flyback, SEPIC, and Cuk converters). This invention relates to the step-up class of switching DC-to-DC power converters by providing not only polarity non-inverting converter topology (positive input to positive output converter voltage) such as ordinary boost converter but also having a polarity inverting topology capable of generating a negative output voltage from the positive input voltage heretofore not available in present step-up switching converters.

Another classification can be made with respect to the converters ability to have a galvanically isolated version featuring a built-in isolation transformer. Galvanic isolation between the source and load ground is also very often a safety requirement. While the other categories have many transformer-coupled and isolated derivatives, the step-up conversion is basically limited to its non-isolated boost topology since currently available isolated configuration of the boost converter has fundamental start-up problem. The present invention introduces several practical isolated versions so that the transformer step-up turns ratio further increases the output voltage in an efficient manner and eliminates the start-up problem associated with prior-art step-up converters. The present invention can also operate from a wide input voltage range such as 4:1 or more as opposed to converters having limited input voltage range such as 2:1 or lower.

Another classifications of switching DC-to-DC converters can be made relative to the number of switches used. In typical Pulse Width Modulated (PWM) converters, switches come in the pairs of complementary switches, such as two switches, four switches, etc., with complementary switches driven alternatively ON and OFF. This was until now believed to be essential prerequisite for existence of viable converters (Reference 5) and the converters with odd number of switches were ruled out. The present invention breaks the new ground by introducing for the first time the switching converters featuring three switches.

Classifications of currently known switching converters can be made also based on the type of the switch voltage and current waveforms into three broad categories:

a) PWM converters in which switch voltages and switch currents are square-waves and regulation is achieved by varying duty ratio of the switch.

b) Resonant converters (such as series resonant and parallel resonant converters) in which either or both switch voltage and/or switch currents are sinusoidal-like and regulation is achieved by varying the switching frequency relative to resonant frequency.

c) Quasi Resonant PWM converters, which are derived from their parent PWM converters by insertion of the additional resonant inductor and resonant capacitors. They have the same number of switches as parent PWM converters but alter switch voltage and/or current waveform to achieve zero voltage or zero current switching at the expense of increasing substantially the voltage and current stresses of the switches by a factor of at least two or more compared to their PWM parent configuration.

The present invention creates a fourth category of the switching converters, which like PWM converters has square-wave voltages and square-wave currents for one part of switching cycle. However, the other part of switching cycle is characterized by switch voltages which are almost square-wave like with superimposed small resonant ripple voltage and switch currents featuring resonant waveforms only slightly higher (10%) in rms value than comparable currents in PWM converter. Such resonant behavior leads then to much reduced voltage stresses on switches when compared to best PWM converters with the same DC conversion gain.

DEFINITIONS AND CLASSIFICATIONS

The following notation is consistently used throughout this text in order to facilitate easier delineation between various quantities:

1. DC—Shorthand notation historically referring to Direct Current but by now has acquired wider meaning and refers generically to circuits with DC quantities;
2. AC—Shorthand notation historically referring to Alternating Current but by now has acquired wider meaning and refers to all Alternating electrical quantities (current and voltage);
3. $i_1$, $v_2$—The instantaneous time domain quantities are marked with lower case letters, such as $i_1$ and $v_2$ for current and voltage;
4. $I_1$, $V_2$—The DC components of the instantaneous periodic time domain quantities are designated with corresponding capital letters, such as $I_1$ and $V_2$;
5. $\Delta v$—The AC ripple voltage on energy transferring capacitor C;
6. $f_S$—Switching frequency of converter;
7. $T_S$—Switching period of converter inversely proportional to switching frequency $f_S$;
8. $T_{ON}$—ON-time interval $T_{ON}=DT_S$ during which switch S is turned ON;
9. $T_{OFF}$—OFF-time interval $T_{OFF}=D'T_S$ during which switch S is turned OFF;
10. D—Duty ratio of the main controlling switch S;
11. D'—Complementary duty ratio $D'=1-D$ of the main controlling switch S;
12. $f_r$—Resonant switching frequency defined by resonant inductor $L_r$ and energy transferring capacitor C;
13. $T_r$—Resonant period defined as $T_r=1/f_r$;
14. $t_r$—One half of resonant period $T_r$;
15. S—Controllable switch with two switch states: ON and OFF;
16. $CR_1$—Two-terminal Current Rectifier whose ON and OFF states depend on S switch states and resonant period $T_r$;
17. $CR_2$—Two-terminal Current Rectifier whose ON and OFF states depend on S switch states and load current value.

BRIEF DESCRIPTION OF THE DRAWINGS

FIG. 1c illustrates voltage stresses of switches in converter of FIG. 1a.

FIG. 3b illustrates the states of the switches in the converter of FIG. 3a.

FIG. 4a is a graph of voltage stresses of primary side switches in the converter of FIG. 3a, and FIG. 4b is a graph of voltage stresses of secondary side switches in the converter of FIG. 3a.

FIG. 11a is a resonant circuit model for converter of FIG. 5a, FIG. 11b illustrates the current of capacitor C in converter of FIG. 5a, and FIG. 11c illustrates the voltage of capacitor C in converter of FIG. 5a.

FIG. 18a illustrates the isolation transformer of converter in FIG. 3a, and FIG. 18b illustrates the transformer magnetizing current for converter in FIG. 3a.

FIG. 19a illustrates the isolation transformer of converter in FIG. 7a, and FIG. 19b illustrates the transformer magnetizing current for converter in FIG. 7a.

FIG. 20 is a graph of volt-seconds for transformer of converter in FIG. 7a.

FIG. 21b illustrates zero ripple current of the input inductor of the Integrated Magnetics structure of FIG. 21a.

FIG. 35a illustrates the half-bridge extension of the converter in FIG. 34a, and FIG. 35b illustrates the full-bridge extension of the converter in FIG. 34a.

PRIOR ART

Prior-Art Flyback Converter

Figure 1A:
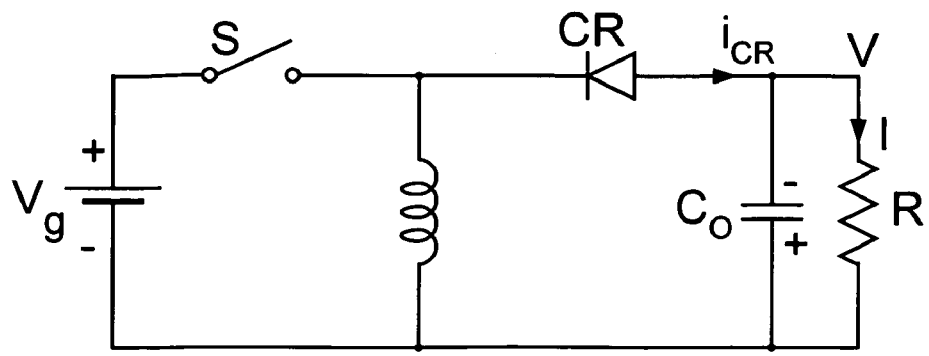
FIG. 1a illustrates a prior-art buck-boost converter.
Figure 1B:
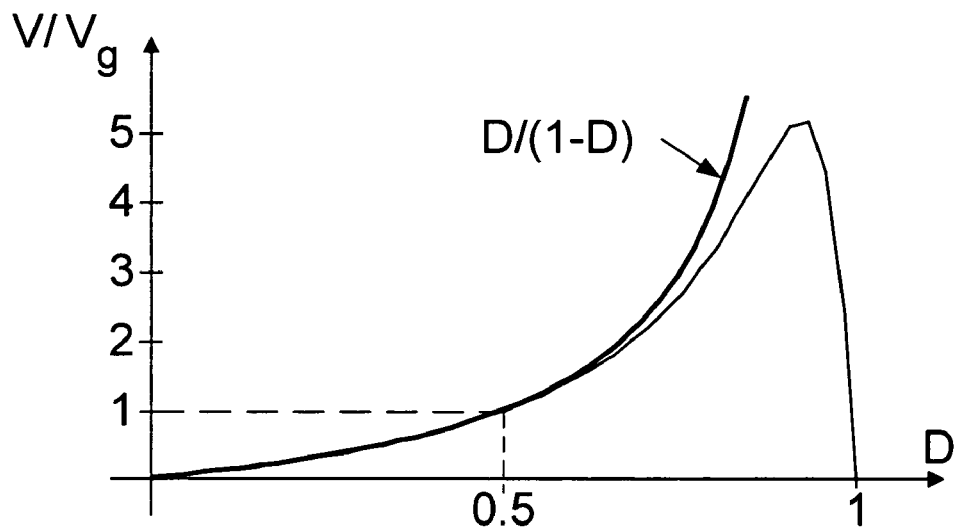
FIG. 1b illustrates DC voltage gains for buck-boost of FIG. 1a (thick line ideal DC gain, thin line actual DC gain)
Figure 1C:
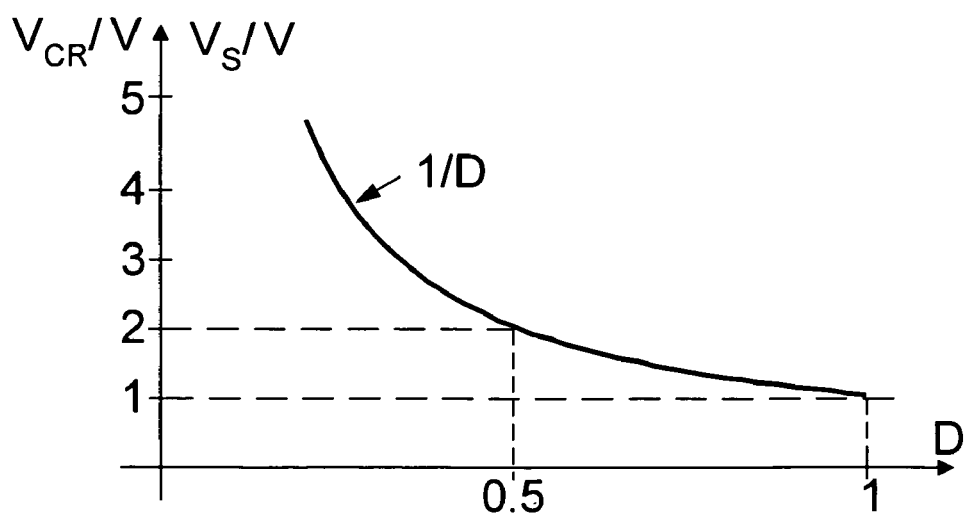

The non-isolated and polarity inverting version of the prior-art Pulse Width Modulated (PWM) flyback switching converter shown in FIG. 1a consists of two complementary switches: when S is ON, CR is OFF and vice versa. It is capable of either step-down or step-up of the DC voltage dependent of operating duty ratio D with ideal DC gain $V=DV_g/(1-D)$ as illustrated in FIG. 1b with thick line and actual measured DC conversion characteristic shown in thin line in FIG. 1b exhibiting a maximum voltage step-up and progressively reduced efficiency when duty ratio approaches 1. One of the important characteristics of the switching converters is the voltage-stress of the switches over the operating duty ratio range. As seen in FIG. 1c, the voltage stress on the output switch of flyback converter could be many times higher than the regulated output DC voltage V, such as twice at D=0.5 and four times at D=0.25. This limits the input voltage range as well as reduces efficiency and increases the cost of the flyback converter. The isolation transformer can be introduced easily in flyback converter by replacing inductor L with a two-winding transformer. However, the same high voltage stresses of both primary and secondary side switches is a serious limitation of this isolated converter. On the positive side, the DC gain characteristic of FIG. 1b shows a desirable property that this converter does not have a start-up problem, since at duty ratio D=0 the output is also at zero voltage thus the output can be gradually increased by increase of the duty ratio D from zero to the operating value. Thus, a soft start with no high in-rush current is one of the positive features of the flyback converter of FIG. 1a. This is in contrast to the prior-art boost, converter of FIG. 2a, which does have a high in-rush current during start-up.

Another drawback of the flyback converter is that its step-down ability also reduces its step-up capability. From its DC gain characteristic in FIG. 1b the step-up region only begins when duty ratio already reaches D=0.5, where DC voltage gain is 1.

Prior-Art Boost Converter

Figure 2A:
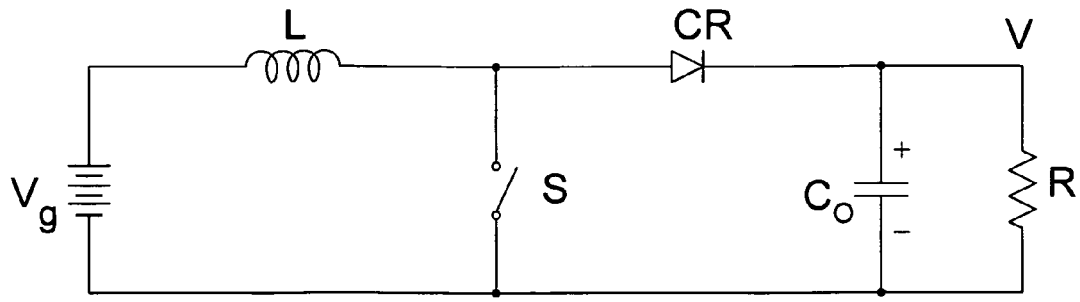
FIG. 2a is a prior-art boost converter, FIG. 2b are the switch states for the boost converter of FIG. 2a, and FIG. 2c illustrates DC voltage gain for boost converter of FIG. 2a (thin line ideal DC gain, thick line actual DC gain).
Figure 2B:
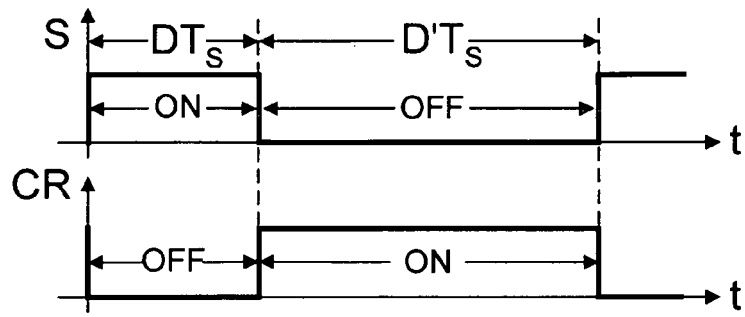
Figure 2C:
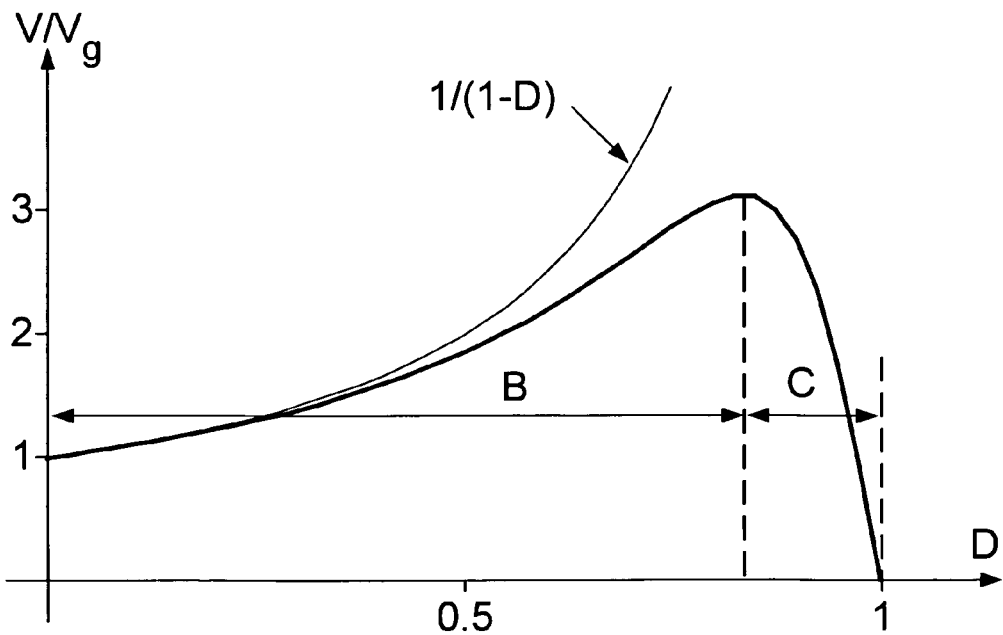

The prior-art PWM boost converter of FIG. 2a and its switching states in FIG. 2b, however, starts its step-up function right from zero duty ratio with DC gain of 1 and has a step-up of 2 at D=0.5 as seen in its idealized DC voltage conversion $V=V_g/(1-D)$ shown in thin line in FIG. 2c. The actual measured DC gain characteristic is marked by thick line in FIG. 2c and reaches a maximum after which the voltage starts dropping down due to increased inefficiency. This step-up region is marked as region B in FIG. 2c, while inefficient region is designated as region C in FIG. 2c.

Note that switches in this converter have the voltage stress limited to output regulated voltage V. However, unlike flyback converter of FIG. 1a whose output voltage is zero at the start, the boost converter with its DC gain of 1 or higher, has the output voltage always higher than the input voltage (FIG. 2c). Yet at the start, the output voltage is zero (discharged output capacitor) thus posing a problem in starting this converter. Nevertheless, in this non-isolated version, the start-up problem is circumvented in a rather brute force manner: when input switch opens the diode CR is conducting and the output capacitor is charged with a very high in-rush current which must be limited in practice by some in-rush current limiter, such as thermistor.

Another limitation of the prior-art boost converter is that it is a non-inverting configuration, that is positive input voltage results in positive output voltage. The switching converter with boost DC conversion gain but capable of voltage polarity inversion: positive input voltage resulting in negative output voltage, is apparently missing.

Prior-Art Isolated Boost Converter

Figure 3A:
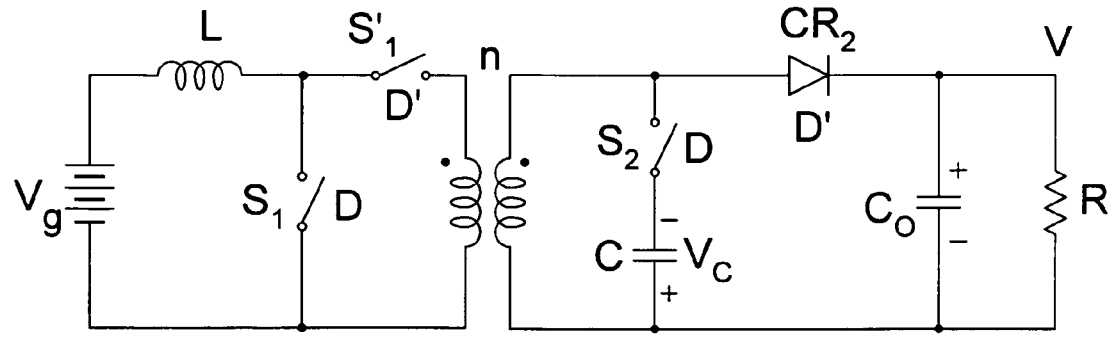
FIG. 3a illustrates a prior-art isolated boost converter.

Introduction of the isolation transformer with a step-up turns ratio into a boost converter (FIG. 3a) can further enhance its natural voltage step-up conversion through the duty ratio D step-up gain. Isolation transformer is also desirable and in many applications required for safety reasons. Finally, the transformer step-down turns ratio can make the converter also operate as an overall voltage step-down converter. Prior-art isolated boost converter is shown in FIG. 3a and its switch-states in FIG. 3b (Reference 8). Unfortunately, the introduction of the isolation transformer does not allow charging of the output capacitor as described previously for non-isolated configuration as isolation transformer prevents that and essentially prevents the converter of even starting up at all. This limitation is one of the reasons why this configuration has not been seen in practice but rather as a theoretical curiosity with still an open start-up problem. This start-up problem seems to be inherent in all isolated switching converters with voltage step-up only DC conversion gain $V=V_g/(1-D)$.

The present invention, however, demonstrates that it is possible to have such an isolated switching converter configuration with boost like features, but which, for small duty ratio does have an effective step-down DC gain characteristic. As shown later in details, such step-down range can be used very effectively for converter start-up to bring it into its nominal step-up operating region.

Note another problem of this prior-art isolated boost converter is that the preferred low voltage stresses of the switches in the boost converter of FIG. 2a are lost. This PWM isolated configuration satisfies the often-cited requirement for PWM converters that they must have even number of switches (Reference 5) either 2, 4, etc., as the odd number of switches such as 3, 5, etc., is not allowed. The prior-art converter in FIG. 3a has two pairs of complementary switches. Introduction of the present invention with only three switches will demonstrate that such requirement for even number of switches (2, 4) is neither necessary nor desired.

Figure 3B:
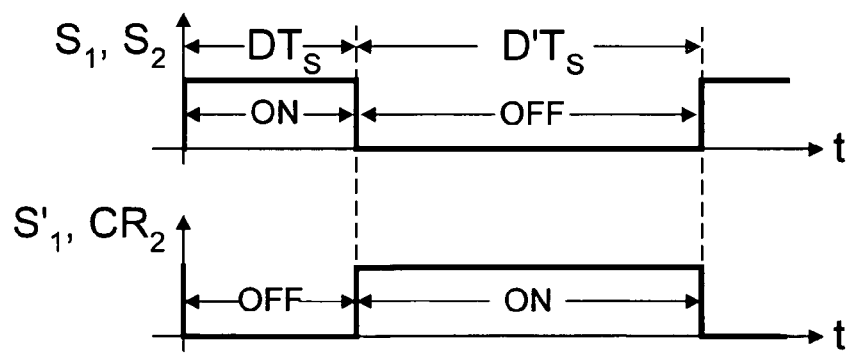

Switches in FIG. 3a operate as complementary pairs: when one switch is ON its complementary switch is OFF and vice versa, such as is the case for $S_1$ and $S_2$ switches and their complementary switches as seen in FIG. 3b. Primary switches are often implemented as active MOSFET transistors. Same holds true for the secondary switch $S_2$ while the other secondary switch could be a simple diode $CR_2$.

Isolation transformer turns ratio n also provides additional DC conversion gain such that overall DC conversion is:

$$V = nV_g/(1-D) \quad (1)$$

The isolation transformer reset is provided by a voltage clamp circuit on the secondary side, which consists of the capacitor C in series with the switch $S_2$. This reset circuit leads to many of the drawbacks of this converter such as: three out of four switches have a high voltage stress when a wider input voltage range is attempted.

Voltage Stresses of Switches

Figure 4A:
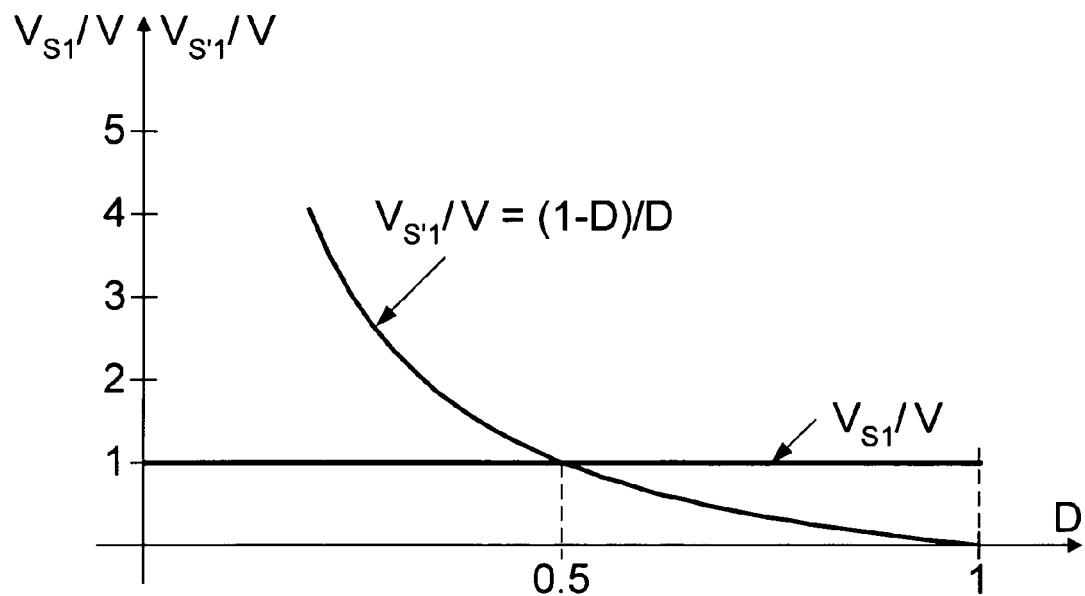
Figure 4B:
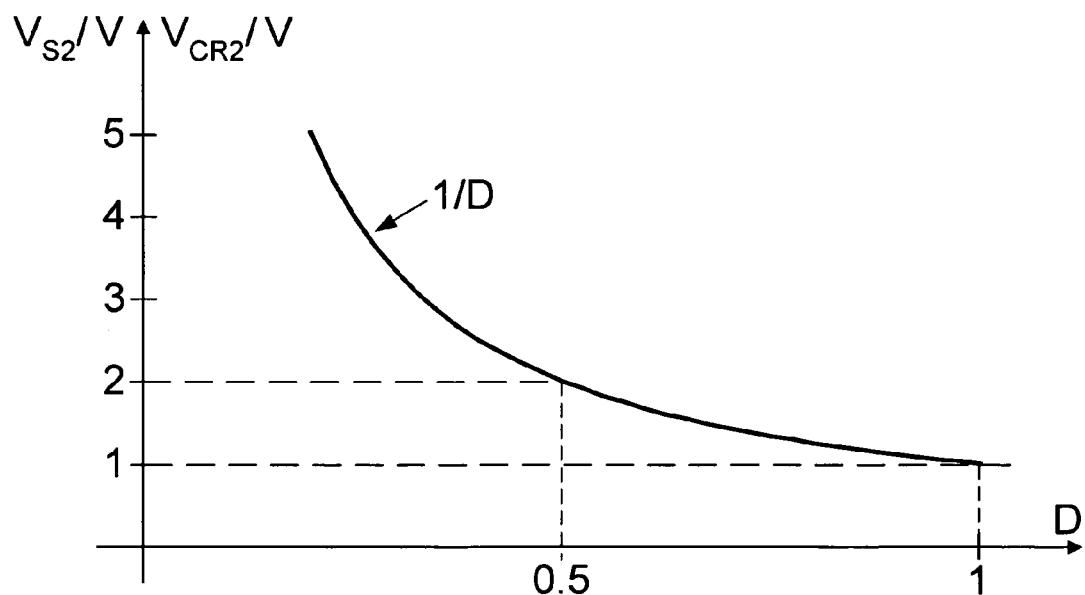

The detailed analysis of the voltage stresses of the four switches in converter of FIG. 3a as a function of the operating duty ratio D results in:

$$V_{S1}/V = 1 \quad (2)$$

$$V_{S'1}/V = (1-D)/D \quad (3)$$

$$V_{S2}/V = V_{CR2}/V = 1/D \quad (4)$$

and is illustrated in the graphs of FIG. 4a and FIG. 4b.

Note that the voltage stresses are shown normalized with respect to output DC voltage V. Since the output voltage V is regulated and constant, one could then easily observe the change of voltage stress levels of switches over the full operating duty ratio range from D=0 to D=1. For example, at duty ratio D=0.5, two out of four switches have voltage stress equal to TWO times the output voltage. The voltage stress exponentially increases further for duty ratios lower than 50%. For example, in the range from duty ratio D=0.25 to D=0.5 the DC step-up changes only from 1.33 to 2 for an input voltage range of 1.5:1, while voltage stresses become 4 times the output voltage. Clearly such a high voltage stresses will result in excessive conduction losses as the switches with high voltage rating also have much increased ON-resistance resulting in lower efficiency and higher cost. This isolated boost configuration hence has a very poor switch utilization ratio: for a given power processed it requires excessive voltage rating and power rating of its switches well above the power being processed in contrast to its non-isolated version.

Objectives

The objectives of the present invention are therefore to eliminate all of the above shortcomings of the prior-art converters and find non-isolated switching converters with the basic boost voltage step-up characteristic such as:

a) A polarity non-inverting topology with low and limited voltage stresses on switches and with in-rush current problem eliminated.

b) A polarity inverting topology with low and limited voltage stresses on switches and with in-rush current problem eliminated.

Further objective is to introduce an isolation transformer in each of the two above non-isolated converters so that the following main features are obtained:

a) Low and limited voltage stresses on all switches over the entire duty ratio operating range from D=0 to D=1.

b) Eliminate both the start-up and in-rush current problems while preserving all other advantages of the converter.

c) Wide input voltage range of 4:1 or more.

d) Find an optimum method to control the converters so that the conversion efficiency can be maximized over wide operating range.

SUMMARY OF THE INVENTION

Basic Operation

Non-Isolated and Non-Inverting Topology

Figure 5A:
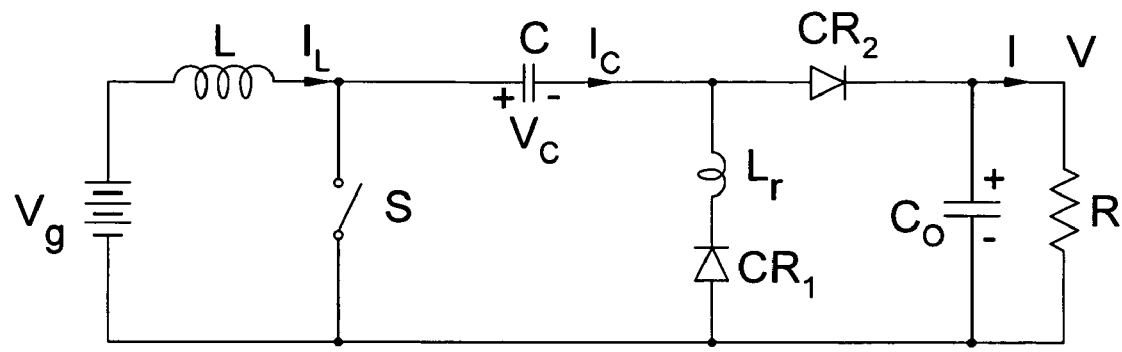
FIG. 5a illustrates the first non-isolated and non-inverting embodiment of the present invention.

The non-isolated version of the present invention is shown in FIG. 5a. The switching topology features a rather unorthodox switching configuration consisting of three switches contrary to the common belief that switches ought to come in complementary pairs only. One of the three switches, switch S, is a controlling switch, which could be implemented as a three terminal active transistor switch such as bipolar transistor or MOSFET transistor. The other two switches can be in its simplest form implemented as illustrated in FIG. 5a as passive two terminal current rectifier devices $CR_1$ and $CR_2$ which switch in response to particular circuit conditions dictated by both the controlling switch S and the choice of the value of the resonant inductor $L_r$. Although the MOSFET transistor has a built-in body diode, which allows bi-directional current flow in switch S this does not alter the operation of the converter compared to the implementation with bipolar transistor with uni-directional current flow. The reason is that the rectifier $CR_1$ is allowing current flow in only one direction during ON-time interval when switch S is also turned-ON.

Figure 5B:
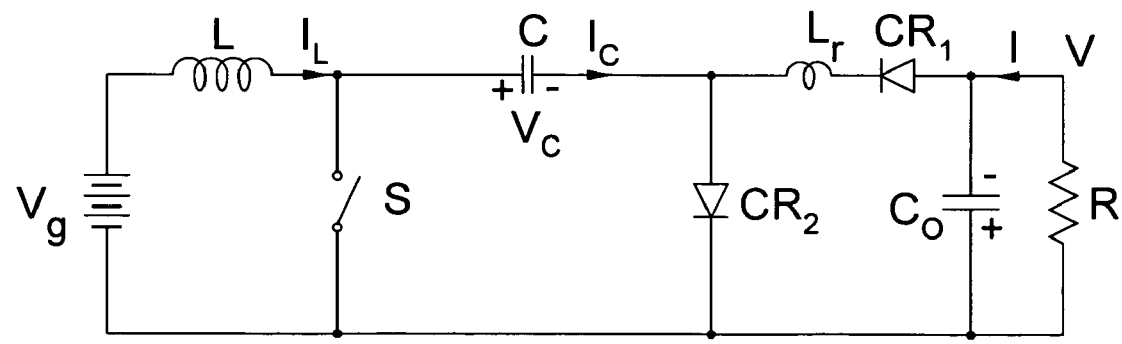
FIG. 5b illustrates the second non-isolated and polarity-inverting embodiment of the present invention.
Figure 5C:
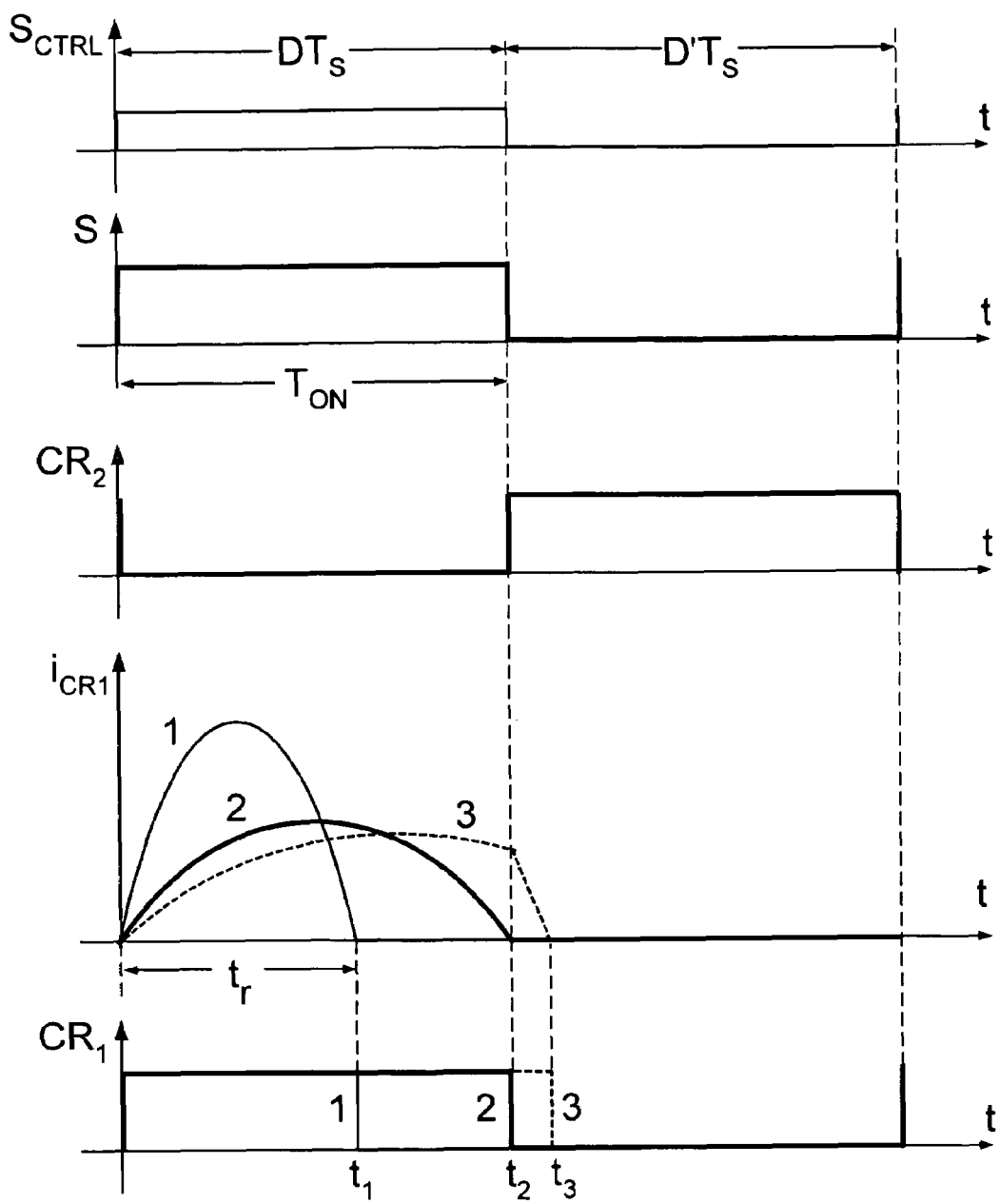
FIG. 5c illustrates the states of three switches for the converters of FIG. 5a and FIG. 5b and impact of three different current $i_{CR1}$ waveforms on the state of switch $CR_1$.

In particular, as seen in FIG. 5c illustrating the state of the three switches, the rectifier $CR_2$ operates as a complementary switch to controlling switch S just like in any PWM converter with complementary pair of switches. Thus, turn-ON of switch S by its control signal forces rectifier $CR_2$ to turn-OFF due to reverse bias applied across it by the output DC voltage. Likewise, turn-OFF of switch S redirects the input inductor current $I_L$ to turn-ON the rectifier $CR_2$. Note that the resonant inductor $L_r$ value has no effect on switching states of rectifier $CR_2$. This is, however, not the case for the rectifier $CR_1$ with the resonant inductor $L_r$ in its branch. As seen in FIG. 5c, the turn-ON of the rectifier $CR_1$ coincides with the turn-ON of switch S. However, the turn-OFF of rectifier $CR_1$ depends on the resonant current $i_{CR1}$ in rectifier $CR_1$ and state of the switch S.

The three qualitatively distinct mode of operations, designated as Mode 1, Mode 2, and Mode 3, are illustrated on FIG. 5c by appropriate designations 1, 2, and 3 to the corresponding resonant current waveforms and the respective switching times $t_1$, $t_2$, and $t_3$ at which the rectifier $CR_1$ is actually turned-OFF. Note that in Mode 1 and Mode 2, the current $i_{CR1}$ is forced to stop at zero current level, as the switch is current rectifier not allowing current resonance to continue into a negative half cycle. On the other hand, in Mode 3 operation, the turning OFF of switch S interrupts resonant current flow before it reaches zero at instant $t_2$ and induces a linear current discharge until instant $t_3$ as seen in FIG. 5c.

The following simple quantitative criteria is used to determine which mode of operation is actually taking place:

Mode 1: $t_r < T_{ON}$     Mode 2: $t_r = T_{ON}$     Mode 3: $t_r > T_{ON}$
where $t_r$ is the half of the resonant period $T_r$.

Mode 1 Operation

In this mode designated by waveforms 1 in FIG. 5c, half cycle of the sinusoidal resonant current change is completed before the end of the ON-time interval $T_{ON}$. The rectifier $CR_1$ is turned-OFF at instant $t_1$ at zero current level and further negative resonant current flow is prevented since the rectifier allows current conduction in only one direction.

Mode 2 Operation

In Mode 2, the half resonant cycle $t_r$ is equal to ON-time interval $T_{ON}$ so that turn-OFF of the rectifier $CR_1$ coincides at instant $t_2$ with the turn-OFF of controlling switch S. This Mode 2 is shown later to be the preferred mode of operation as it has additional performance benefits over the other two modes.

Mode 3 Operation

In this mode of operation, the half resonant cycle $t_r$ is bigger than $T_{ON}$ so the controlling switch S is turned OFF before resonant current was reduced to zero. At that instant $t_2$ (FIG. 5c), rectifier $CR_2$ is turned ON and the output DC voltage V is applied across resonant inductor $L_r$ causing a linear decrease of resonant current until zero current level is reached at instant $t_3$ (waveform 3 on FIG. 5c) resulting in turn-OFF of rectifier $CR_1$.

Polarity Inverting Topology

The boost converter of FIG. 2a is a non-inverting configuration, which generates positive output voltage from positive input voltage with respect to a common ground. There is no polarity inverting extension of the prior art-boost converter of FIG. 2a. The present invention discloses also another switching converter topology shown in FIG. 5b, which is polarity inverting. The same switching states of FIG. 5c apply also to converter of FIG. 5b.

Note however, the difference between the two converters. Non-inverting converter of FIG. 5a has a DC voltage $V_C$=0 on capacitor C while inverting configuration of FIG. 5b, however, has a capacitor DC voltage $V_C$=V. Therefore, this voltage $V_C$ turns-OFF rectifier $CR_2$ in converter of FIG. 5b. In converter of FIG. 5a, the output DC voltage V turns-OFF the rectifier $CR_2$.

Another difference is that the output capacitor $C_0$ in non-inverting converter of FIG. 5a is supplied by a square-wave like current of rectifier $CR_2$, while the output capacitor $C_0$ in the inverting converter of FIG. 5b is supplied by the resonant half-cycle current of rectifier $CR_1$ as illustrated with current waveforms 1, 2, and 3 in FIG. 5c. This clearly results in different output ripple voltage performance for the two cases, as explained in later section in more details. Nevertheless, the three distinct modes of operation still apply for the polarity inverting topology of FIG. 5b, subject to the differences outlined above.

Comparison of Inverting and Non-Inverting Topologies

The comparison of the two non-isolated configurations in FIG. 5a and FIG. 5b, may indicate at first some obvious visual similarities: the polarity inverting configuration is obtained by simply exchanging the two diode branches connections to output terminal and common output terminal to obtain the polarity inversion of FIG. 5b. The two configurations, however, have a more fundamental performance differences as described in more details below.

The two converter topologies are completely independent topologies in their own right, just like the prior art non-inverting SEPIC converter (References 3 and 7) and prior-art inverting Cuk converter (References 1 and 3), both having same DC voltage step-down/step-up conversion of the flyback converter. However, polarity inverting Cuk converter has markedly different characteristics, such as continuous (non-pulsating) instead of pulsating output current of SEPIC converter. As discussed in later section, there is a big difference when non-inverting and inverting converters of FIG. 5a and FIG. 5b are compared with respect to output ripple voltage and the size and rms current requirements of the output capacitor $C_0$.

The two converters in FIG. 5a and FIG. 5b each have a positive input voltage source. However, each can have a straightforward extension for negative input voltage, which results in negative output for non-inverting converter in FIG. 5a and positive output for inverting converter in FIG. 5b. Either of the two polarity inverting embodiments of the present invention in FIG. 5b may find applications not heretofore available for the prior-art polarity non-inverting boost converter of FIG. 2a and non-inverting step-up converter of FIG. 5a.

Actual Measured DC Gain Characteristics

Figure 6:
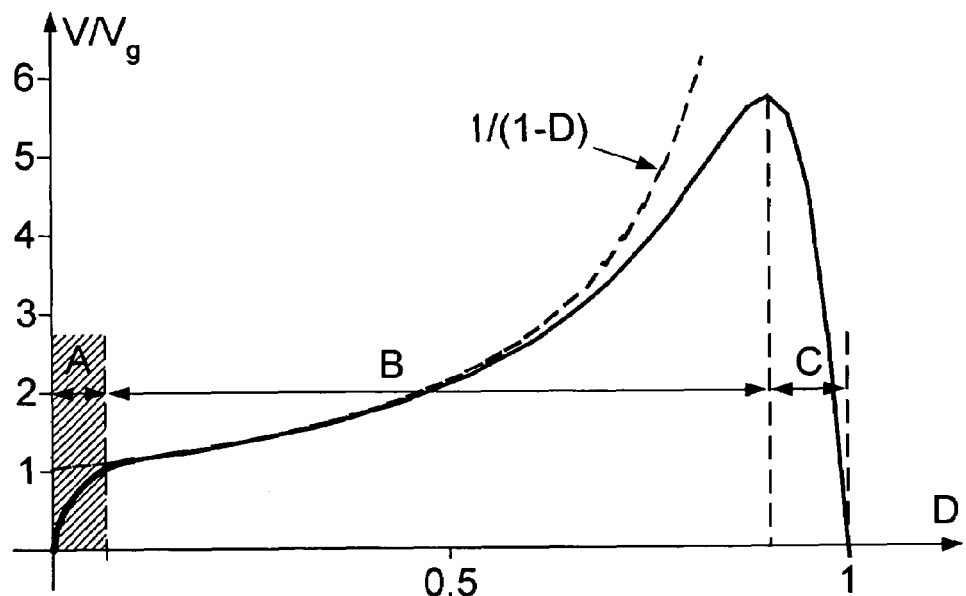
FIG. 6 illustrates the DC voltage gain characteristics for converters of FIG. 5a and FIG. 5b where dashed line shows ideal DC gain and solid line is actual DC gain with shaded area A for step-down region, region B for step-up, and region C of fast voltage drop off after maximum voltage step-up.

The idealized DC gain characteristic for both non-isolated converters of FIG. 5a and FIG. 5b follows the DC gain given by (1) (for n=1) as illustrated by dashed lines in FIG. 6. The actual measured DC gain characteristic shown in solid line on FIG. 6 deviates from this ideal DC gain characteristic and, because of conversion losses, after maximum was reached, it starts dropping until it becomes zero at duty ratio of 1.0. This is same as in the boost gain characteristic of FIG. 2c and results in inefficient region of operation marked by letter C in FIG. 6. Note also the existence of the wide and efficient voltage step-up region marked B as was the case for boost gain in FIG. 2c.

However, note that the actual measured DC gain characteristic of the present invention at very low duty ratios and for light load current does not follow the idealized DC gain characteristic of the boost converter as in (1), but actually follows the thick line in graph of FIG. 6 to result in a new and narrow region marked A in FIG. 6 which exhibits step-down DC gain characteristic. It is this narrow step-down region, which enables a converter to start-up by operating in Mode 3 and is used to bring the converter into its nominal and wide operating step-up region marked B in FIG. 6.

The detailed explanation for this new step-down phenomena at low duty ratios is given in later section when the operation of the converter is explained in more details and the cause of such step-down DC gain is revealed and fully analyzed. The practical ramification of such behavior is very significant. The isolated converters of FIG. 7a and FIG. 7b, with DC gain characteristic of FIG. 6, can nevertheless be started just as easily and smoothly as a flyback converter since both have a narrow step-down region A shown shaded in FIG. 6.

Isolated Extensions

Figure 7A:
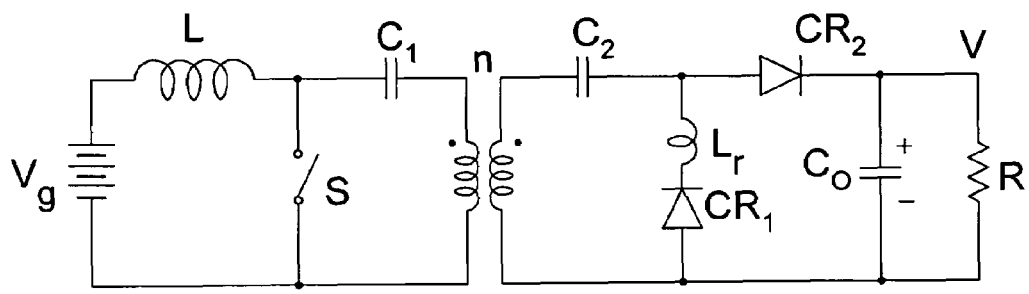
FIG. 7a illustrates the third embodiment of present invention: the isolated version of the converter in FIG. 5a, and FIG. 7b illustrates the fourth embodiment of the present invention: the isolated version of the converter in FIG. 5b.
Figure 7B:
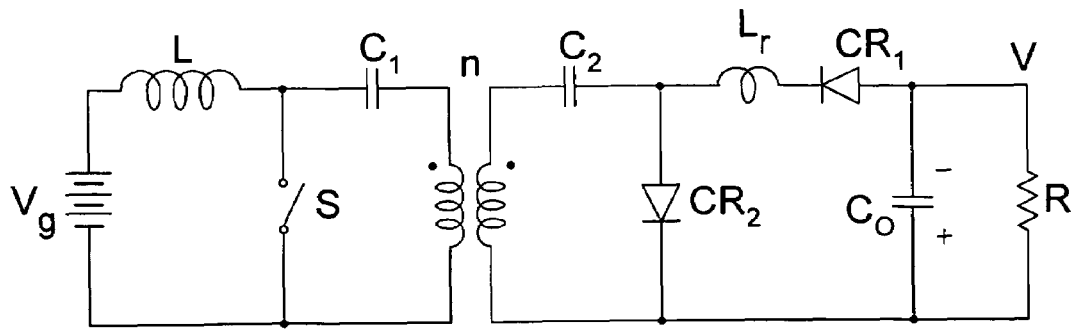

The isolated versions shown in FIG. 7a and FIG. 7b are obtained by splitting the floating capacitor C of FIG. 5a and FIG. 5b into two capacitors $C_1$ and $C_2$ in series and then inserting an isolation transformer with turns ratio n. Both have the same ideal DC voltage gain given by (1) and also retain the same switching states as their non-isolated counterparts given in FIG. 5a and FIG. 5b.

In the isolated versions of present invention, the primary side controlling switch S can be implemented as an active transistor switch, while the two switches on the secondary side are again simple diodes. Turning ON and OFF of the primary side switch S forces the diode switch $CR_2$ to operate out of phase with the main switch S, so when S is turned-ON, $CR_2$ is turned-OFF and vice versa. The previously described operation of $CR_1$ rectifier and three modes of operation equally apply to isolated configurations.

Analysis of the Voltage Stresses of the Three Switches

The detailed analysis of the voltage stresses of the three-switches in both isolated converters of FIG. 7a and FIG. 7b are given by:

$$V_S/V = 1/n \quad (5)$$

$$V_{CR1}/V = V_{CR2}/V = 1.0 \quad (6)$$

where n is transformer turns ratio.

Figure 8A:
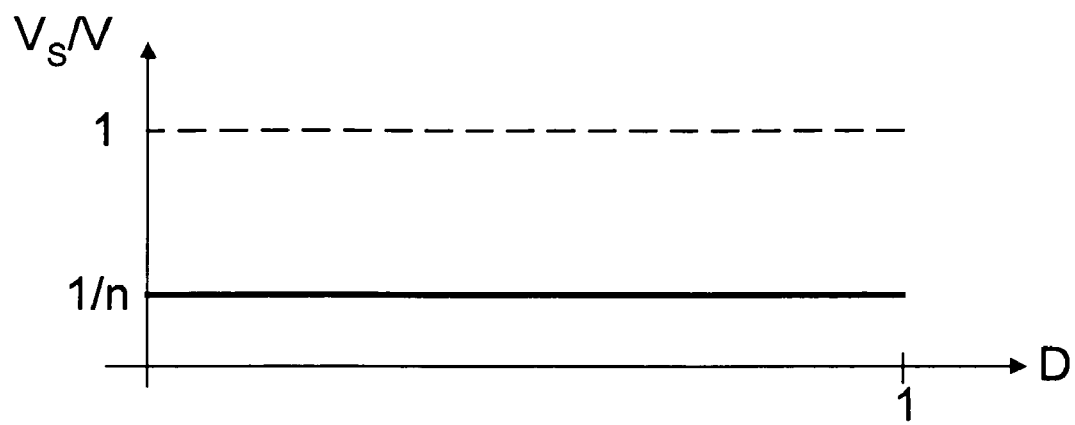
FIG. 8a is a graph of voltage stresses of the primary side switch in the converter of FIG. 7a and FIG. 7b.
Figure 8B:
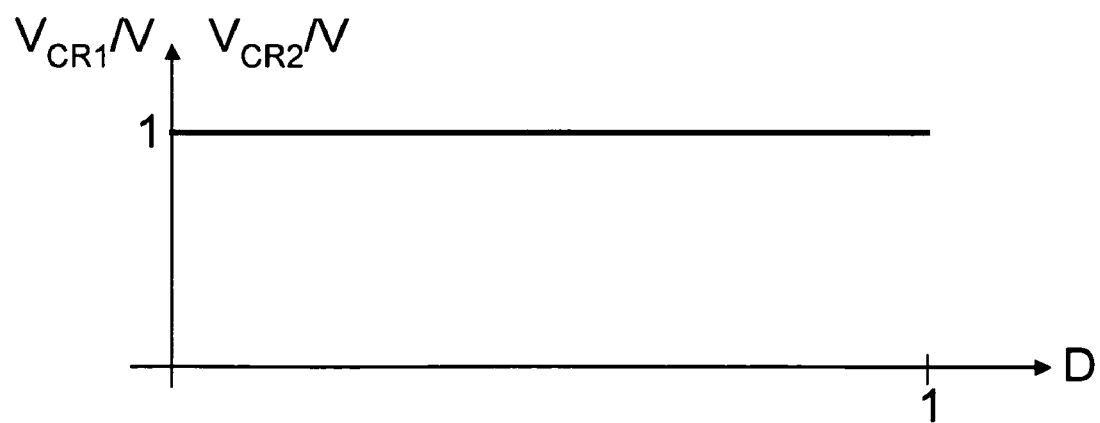
FIG. 8b is a graph of voltage stresses of the secondary side switches in the converter of FIG. 7a and FIG. 7b.

The voltage stress levels are shown graphically in FIG. 8a and FIG. 8b as a function of duty ratio D for all three switches. Note that the voltage stress level is constant and independent of the operating point. The desired goals have been achieved:

a) the secondary side switches $CR_1$ and $CR_2$ have the limited and low voltage stresses no greater than the regulated output DC voltage V.

b) the primary side switch S also has the limited and low voltage stress equal to output DC regulated voltage V divided by the step-up turns ratio of the transformer.

c) The voltage stresses are independent of the operating point so all the switches can be operated safely without danger of the voltage breakdown.

As a direct benefit a wide input voltage range is possible without any penalty on the circuit operation. This is in stark contrast to most of the PWM converters which have a very narrow input voltage range and have to be specially guarded by control circuitry to prevent a catastrophic failure of the converter due to overvoltage stresses on switches and a voltage breakdown under particular operating conditions, such as start-up, shut down, or some abnormal transient circuit conditions.

Therefore, lower cost, lower conduction losses, and high efficiency can be achieved simultaneously. As this performance is available over the full duty ratio range from zero to 1.0, there is no input voltage range limitations, neither the potential of blowing up any of the switches. Clearly, such low and limited voltage stress free of potential "blow-up" leads to reliable operation.

In the special case of transformer's turns ratio n=1, and for non-isolated versions, all three switches have the favorable voltage stress levels equal to the regulated output DC voltage V at all operating condition.

The three-switch configuration does not have efficiency problems because of the unconventional and unique use of the resonant inductor $L_r$. Note that the diode switch $CR_1$ is ideally turned-ON at zero current at the beginning of the ON interval and turned-OFF at zero current level at the end of the ON interval by the sinusoidal resonant current of the resonant inductor $L_r$ as described in more details in the Section on Analysis of the Resonant Circuit. As long as the ON-time interval is long enough to allow the full discharge of capacitor with half cycle of resonant current, the diode $CR_1$ current reduces to zero and this diode is thus turned OFF under ideal zero current condition. This, in fact, eliminates the substantial turn OFF losses of conventional converters caused by long reverse recovery time and high reverse currents of the high voltage diodes. Since inductor $L_r$ releases all its stored energy before switch turns-OFF, there are no turn-OFF losses of that switch.

Operation without Resonant Inductor $L_r$

Figure 9A:
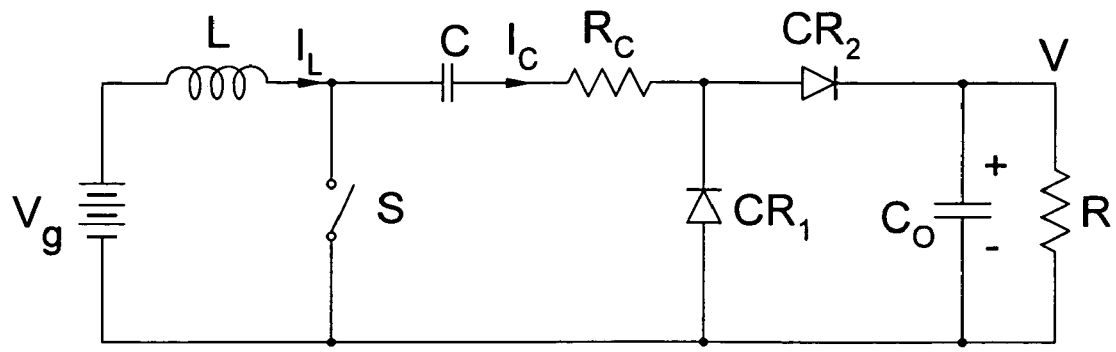
FIG. 9a illustrates a converter of FIG. 5a without a resonant inductor $L_r$, but with ESR of capacitor C.
Figure 9B:
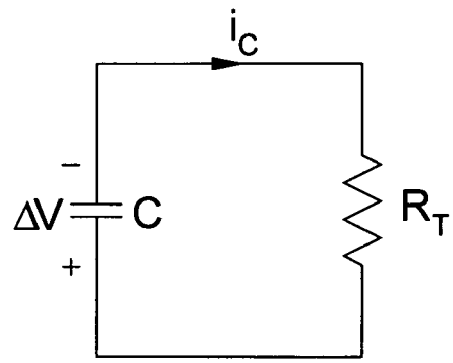
FIG. 9b illustrates a resistive discharge circuit for capacitor C.
Figure 9C:
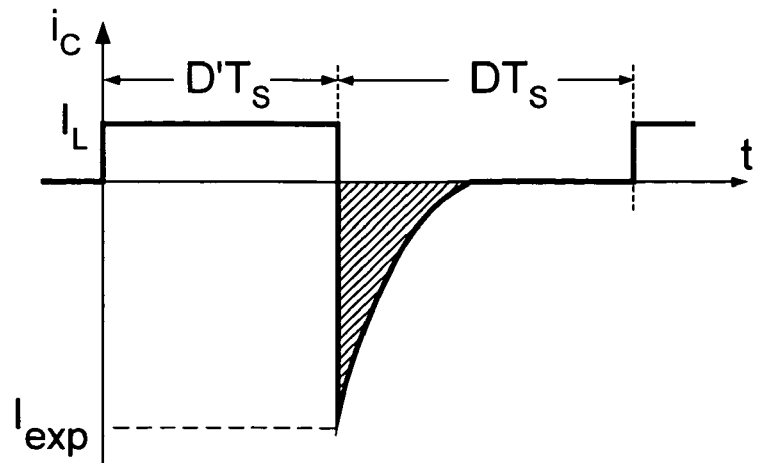
FIG. 9c illustrates capacitor C discharge current.

The following analysis describes the importance of the inclusion of resonant inductor $L_r$ and its specific placement in series with the appropriate diode rectifier. One might be tempted to operate the converter of FIG. 5a without the resonant inductor $L_r$ such as shown in FIG. 9a. The energy transfer capacitor C charged to Δv during OFF-time interval is then discharged in a lossy way as shown in FIG. 9b where the resistance $R_T$ is total of ON-resistance of the switch S, resistance of resonant inductor $L_r$ and ESR resistance $R_C$ of capacitor C. When switch S is turned ON, capacitor stored charge is quickly discharged with the big discharge current which is quickly reduced in an exponential way to zero level well before the end of the ON-time interval as shown in FIG. 9c.

Let us illustrate this loss via an example of a 100V to 200V, 100 W step-up converter operating at 50% duty ratio and 100 kHz and having C=0.5 μF. During OFF interval (5 μs), the capacitor is charged by 1 A input current. The voltage at the end of OFF interval is:

$$\Delta v = ID'T_S/C = 10V \quad (7)$$

This ripple voltage on the energy transfer capacitor is about 5% of the 200V peak-to-peak switching voltage waveform.

The power loss is thus:

$$P_L = f_S C(\Delta v)^2 = 2.5 \; W \quad (8)$$

However, if switching frequency were raised to 300 kHz, it would lead to 7.5% efficiency loss, which is unacceptable.

SUMMARY OF THE ADVANTAGES

The advantages of present invention can be therefore summarized as follows:

1. Step-up/step-down converter, which provides high efficiency operation;
2. No start-up problem;
3. No in-rush currents;
4. Polarity inverting configuration;
5. Voltage stresses of rectifiers on secondary side limited to output DC voltage;
6. Voltage stress of the input switch limited to output DC voltage divided by transformers turns ratio n;
7. Wide input voltage range with limited and low voltage stresses on all three switches;
8. One active switch on primary and two passive (diodes) switches on the secondary side;
9. Isolation transformer makes possible additional voltage step-up or step-down based on transformer turns ratio n;
10. Small and efficient isolation transformer with no stored DC energy;
11. Constant ON-time operation optimizes performance over wide input voltage range;
12. Additional advantages when operated from front-end Power Factor Corrected converter;
13. Additional advantages for high voltage step-up for solar photovoltaic applications;
14. Integration of input inductor and isolation transformer leads to further performance improvements.

BACKGROUND OF THE INVENTION

Detailed Analysis of the Non-Isolated Step-Up Converter

To understand the converter operation and derive the analytical solution, it is important to observe that the converter of FIG. 5a behaves fundamentally different in two distinct intervals: OFF-time interval and ON-time interval. We observe the voltage and current waveforms of the three switches designated S, $CR_1$ and $CR_2$ in FIG. 5a and their respective voltages and currents displayed in FIG. 10:

a) PWM interval: OFF-time interval ($D'T_S$) during which main switch S is open (zero current) and exhibits square-wave like voltage while diode $CR_1$ is open (zero current) and exhibits square-wave like voltage V with small superimposed triangular ripple voltages due to finite capacitor C value, while diode $CR_2$ is closed (zero voltage) and exhibits square-wave like current with a superimposed triangular ripple current due to finite inductor L value. Hence, all three-switch waveforms follow the general features of the conventional PWM converters in this interval. The two switch voltages and one switch current exhibit square-wave like features of the PWM converters.

b) Resonant interval: ON-time interval during which the current is through a closed main switch S (shown shaded in FIG. 10) consists of sum of the resonant inductor current and input inductor current; the current through a closed diode switch $CR_1$ exhibits sinusoidal resonant current (half a resonant sinusoidal cycle) such as $i_{CR1}$ shown shaded in FIG. 10, while the voltage $V_{CR2}$ across the open $CR_2$ switch exhibits quasi square-wave behavior, with a small resonant (cosinusoidal) ripple voltage of magnitude. $\Delta v$ superimposed on top of the large square-wave voltage V and shown shaded in FIG. 10. Hence, the two switch currents and one switch voltage exhibit resonant like features in this interval.

Figure 10:
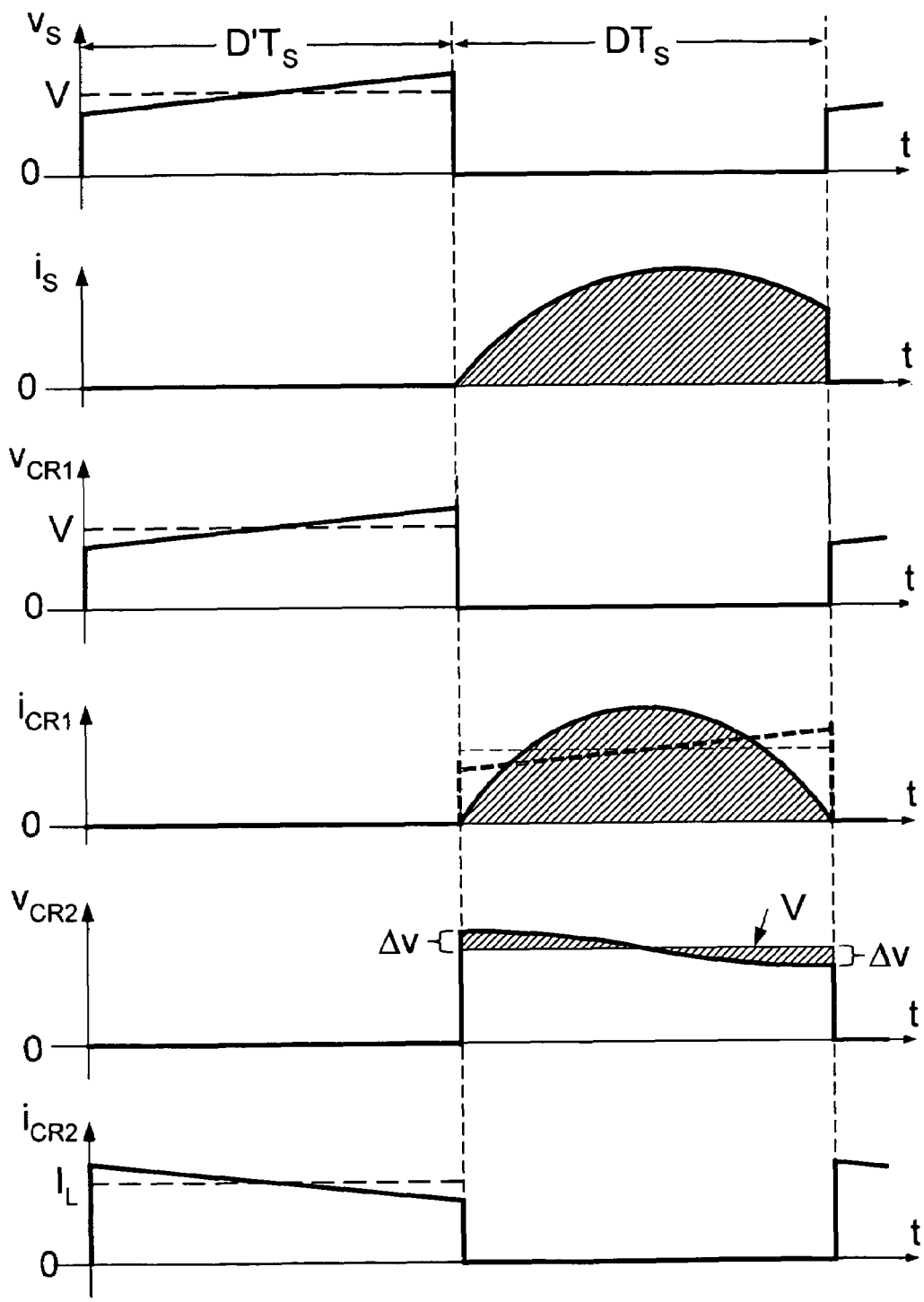
FIG. 10 illustrates the waveforms of the voltages and currents of the three switches in the converter of FIG. 5a featuring PWM interval (OFF-time interval $D'T_S$) and Resonant interval (ON-time interval $DT_S$).

In order to further emphasize those differences the waveforms, which have distinctly different shape than in the PWM converters are shown shaded in FIG. 10.

This operation can be contrasted with the PWM converters, which in both intervals exhibits square-wave like operation of the above OFF-time interval. Nevertheless, the operation in the above ON-time resonant interval exhibits current waveform, which despite its resonant nature has the rms current value only slightly increased above the value of an equivalent square-wave current with the same area. This is illustrated with the thick dotted line waveform for $i_{CR1}$ diode current, which has the same area as the shaded area in FIG. 10. Yet, the actual resonant current (shaded waveform) has the rms current value only 1% higher than its dotted line counterpart.

The voltage stress is practically the same: the triangular ripple of PWM converter is replaced by an equivalent resonant ripple voltage of equal magnitude $\Delta v$. Actually, the present invention has a big advantage in terms of the voltage stresses on its three switches. The switch voltage stresses of the four-switch PWM converter shown in FIG. 4a and FIG. 4b should be compared with the voltage stresses in FIG. 8a and FIG. 8b. Since Quasi-resonant PWM (QRPWM) converters have even much higher switch current and switch voltage stresses then their PWM parent configuration (Reference 5) the present invention excels in having much lower voltage stress of the switches and current stresses comparable to the switches of best PWM converters.

Analysis of the Resonant Circuit

Figure 11A:
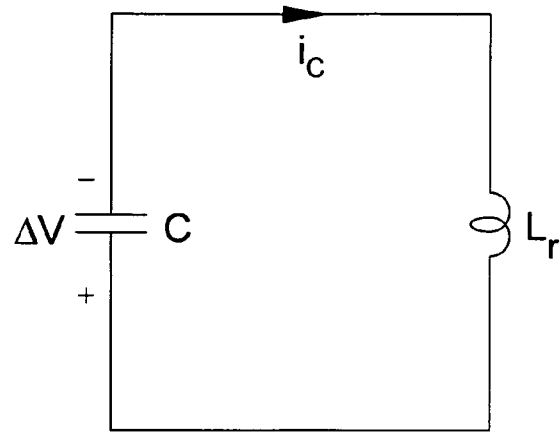

In order to find the resonant current waveforms displayed in FIG. 10 for resonant ON-time interval we need to solve the resonant circuit of FIG. 11a subject to the initial conditions imposed during the previous PWM OFF-time interval given by:

$$i_r(0)=0 \quad (9)$$

$$v_r(0)=\Delta v \quad (10)$$

The resonant solution is obtained as:

$$i_r(t) = I_P \sin\left(\frac{f_r}{2\pi}t\right) \quad (11)$$

$$v_r(t) = \Delta v \cos\left(\frac{f_r}{2\pi}t\right) \quad (12)$$

$$\Delta v = I_P R_N \text{ where} \quad (13)$$

$$R_N = \sqrt{\frac{L_r}{C}} \quad (14)$$

where $R_N$ is the natural damping resistance and $$f_r = \frac{2\pi}{\sqrt{L_r C}} \quad (15)$$

where $f_r$ is the resonant frequency.

Figure 11B:
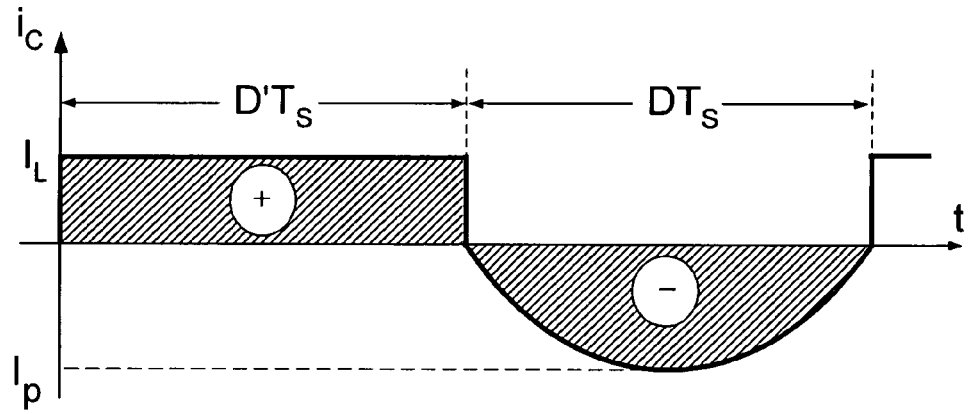

The initial voltage $\Delta v$ at the beginning of resonant interval can be calculated from input inductor current $I_L$ during $D'T_s$ interval in FIG. 11b as:

$$\Delta v = \frac{1}{2}\frac{I_L D'}{C f_s} \quad (16)$$

Substitution of (16) and (14) into (13) results in $$I_P = I_L D' \pi f_r / f_s \quad (17)$$

For simplicity, and without loss of generality, we assumed that the input inductor current $I_L$ is large so that the superimposed ripple current is negligible and can be considered constant at the DC level $I_L$.

Three Modes of Operation

Figure 12A:
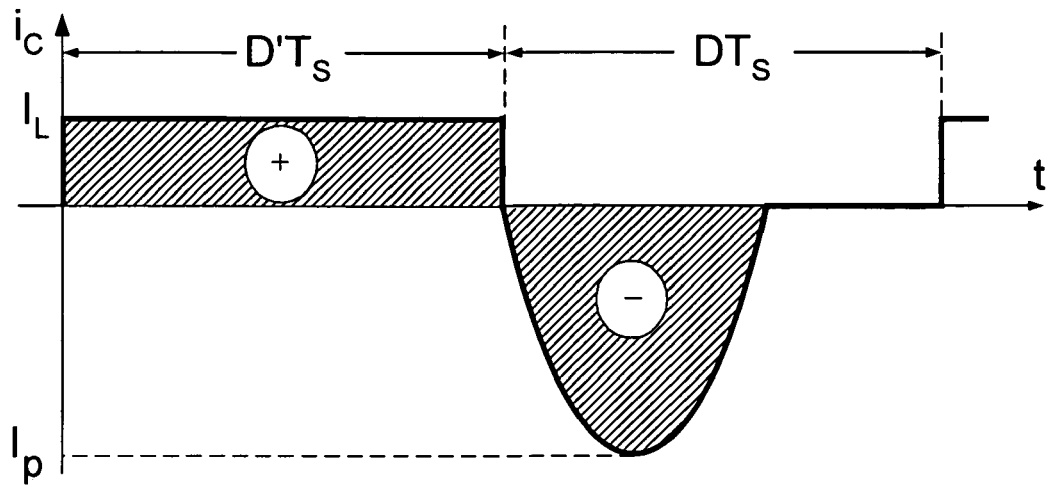
FIG. 12a illustrates capacitor C current when ON-time interval $DT_S$ is longer than half the resonant period.
Figure 12B:
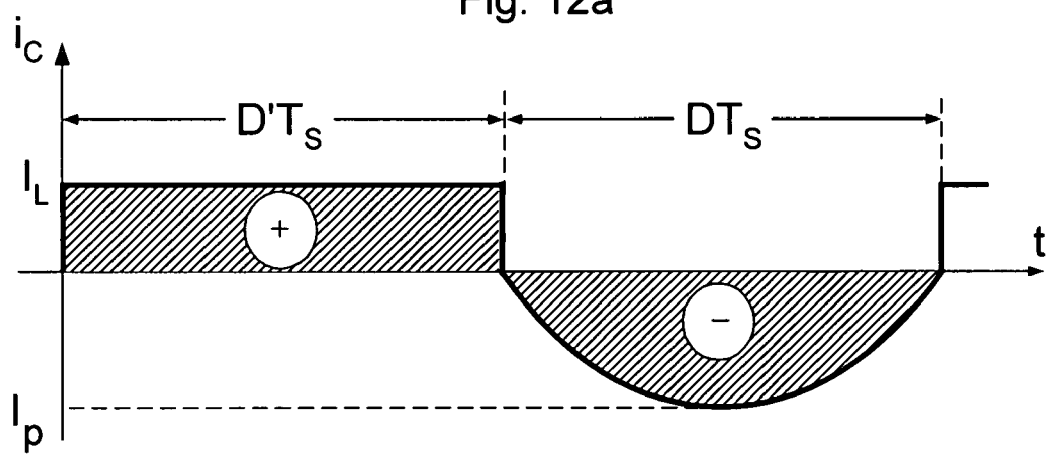
FIG. 12b illustrates capacitor current when ON-time interval $DT_S$ is equal to half the resonant period.
Figure 12C:
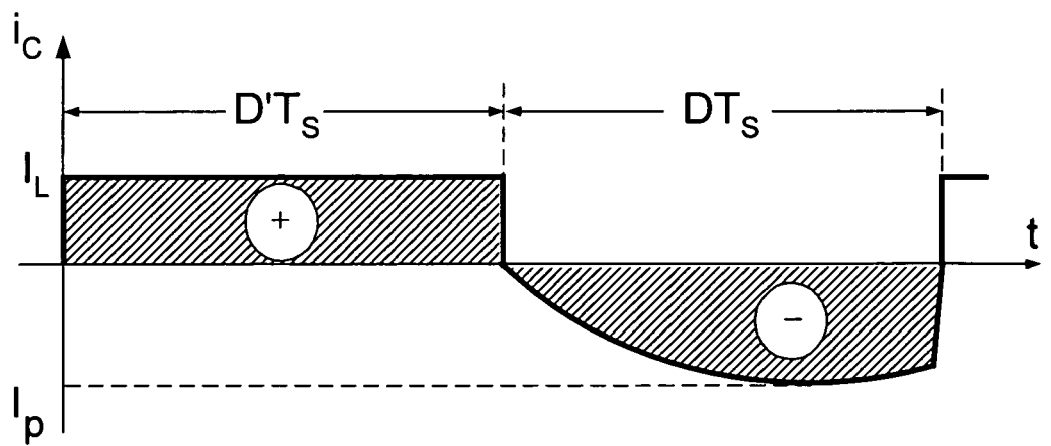
FIG. 12c illustrates capacitor current when ON-time interval $DT_S$ is shorter then half the resonant period.

The capacitor C current during the whole switching period is described by three qualitatively distinct cases illustrated in FIG. 12a, FIG. 12b and FIG. 12c. All three cases must satisfy the steady-state conditions with charge balance on the capacitor C. This translates into the requirement that the two areas representing total charge and discharge in respective intervals must be equal as shown by shaded areas in FIG. 12a, FIG. 12b, and FIG. 12c. For the three cases we assume the same fixed OFF-time and the same fixed ON-time interval (chosen equal for simplicity in FIGS. 12a, b, and c) thus equal to half the switching period. Note that the resonant frequency $f_r$ depends on choice of $L_r$ and C as given by (15).

From the initial condition (9) and sinusoidal resonant current solution (11), it is clear that the resonant discharge starts at zero current and must end when resonant current reaches zero again and turns OFF rectifier $CR_1$ at that moment. This results in the first two out of three distinct modes described below:

Mode 1 (FIG. 12a): $T_r/2 < T_{ON}$ (18)

Mode 2 (FIG. 12b): $T_r/2 = T_{ON}$ (19)

Mode 3 (FIG. 12c): $T_r/2 > T_{ON}$ (20)

In the third distinct Mode 3, $CR_1$ rectifier is forced to turn OFF at the end of ON-time interval even though the resonant current still has a high non-zero value. This is caused by turn-OFF of the main switch, which causes turn-ON of the $CR_2$ switch, so that high negative voltage (output DC voltage V) is applied across the resonant inductor causing its fast linear discharge to zero at which point the $CR_1$ switch turns OFF.

Out of the three possible modes of operation, the Mode 3 (FIG. 12c) is the least desirable as it introduces the large turn-OFF losses and at the same time fast edges and abrupt transition; not desirable from noise and EMI point of view. The Mode 1 (FIG. 12a) is not desirable from the efficiency point of view. Compared to Mode 2 (FIG. 12b) it introduces higher rms current for the same input-output conversion ratio and thereby only contributes to the increased conduction losses of the switches as well as other conduction losses. Clearly, the Mode 2 emerges as the best mode of operation.

BEST MODE OF OPERATION

The best mode of operation is Mode 2 (FIG. 12b) when the resonant discharge interval (half of the resonant period) is equal to the ON-time switching interval. In that case, in addition to lowest conduction losses, the rectifier $CR_1$ turns-OFF under ideal conditions of zero current eliminating undesirable and large turn-OFF losses associated with the reverse recovery current losses which are especially prevalent in high voltage rectification. This in turn also leads to minimum turn-OFF losses of the main active switch S. To regulate the output voltage against input voltage and output current changes, the OFF-time interval must be variable, which effectively results in a variable switching frequency control with constant ON-time interval as discussed next.

Constant ON-Time and Variable OFF-Time Control

If the ON-time of the main switch S is equal to half of a resonant period, then the resonant discharge current waveform will be exactly half a sine wave. There are several benefits operating in this mode. The rms current of a sine-wave current is only 11% higher than the rms value of the average current during the same interval. Therefore the rms current (and the corresponding power loss) in the resonant circuit (including S, $CR_1$, the energy transfer capacitor C and the resonant inductor $L_r$) will be significantly lower than if the circuit is discharged with a more "spiky" waveform with higher rms current.

In best Mode 2 of operation, the ON-time is kept constant as per:

$$T_{ON}=DT_s=T_r/2=\text{constant} \quad (21)$$

so that duty ratio is proportional to switching frequency, or:

$$D=f_S/2f_r \quad (22)$$

Thus, voltage regulation is obtained by use of the variable switching frequency $f_S$. However, this results in corresponding duty ratio D as per (22). Note that all DC quantities, such as DC voltages on capacitors and DC currents of inductors are still represented as a function of duty ratio D only, as in the case of conventional constant-switching frequency operation.

Figure 13A:
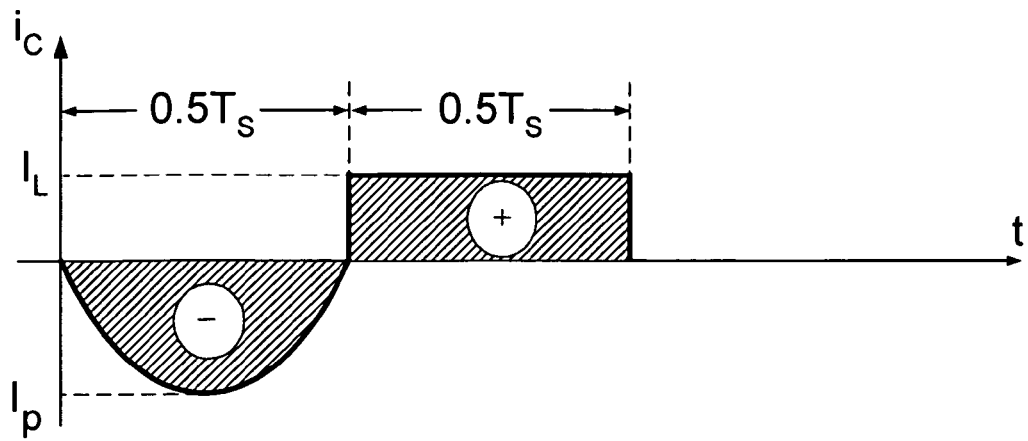
FIG. 13a illustrates capacitor C current waveform for constant ON-time interval with operation at D=0.5.

The previous preferred case of FIG. 12b and operation at D=0.5 is now illustrated in FIG. 13a but now with the constant ON-time (interval $DT_s$) displayed first to emphasize the variable OFF-time and variable switching frequency. From (22) it follows that a 2:1 change in duty ratio D results in equal 2:1 change in switching frequency $f_S$. This is illustrated by FIG. 13b for D=0.33 and by FIG. 13c for D=0.67.

Resonant Circuit Analysis Under Constant ON-Time Operation

Figure 13B:
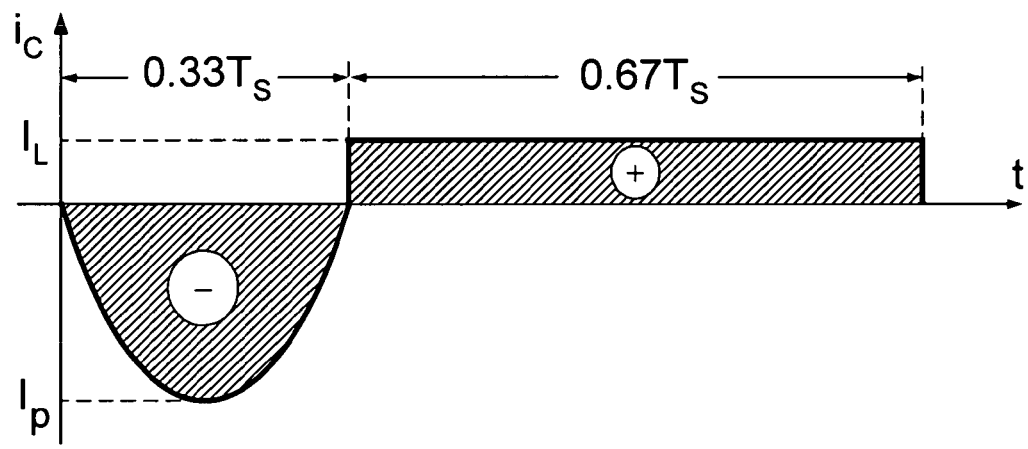
FIG. 13b illustrates capacitor C current waveform for constant ON-time interval with operation at D=0.33.
Figure 13C:
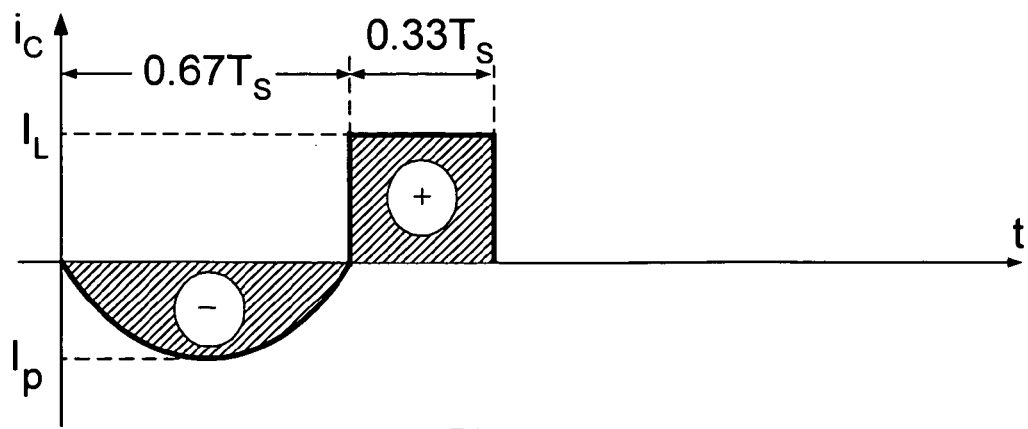
FIG. 13c illustrates capacitor C current waveform for constant ON-time interval with operation at D=0.67.

The capacitor C current waveforms in best Mode 2 operation are shown in FIG. 13a, FIG. 13b and FIG. 13c for three different duty ratios and corresponding switching frequencies. Note that the resonant inductor current is the same as the capacitor C current during the $DT_s$ interval. Since capacitor C current must be charge balanced, the areas shown shaded must be equal in all three cases of different duty ratios. Clearly, this condition imposes a quantitative relationship between the peak value $I_P$ of the resonant current and average input current $I_L$. Substitution of (22) into (17) results in:

$$I_P=I_L\pi/2(D'/D) \quad (23)$$

for all duty ratios in general. For a special case of 50% duty ratio:

$$I_P=I_L\pi/2 \quad (24)$$

This is illustrated by the capacitor current waveform in FIG. 13a. Note that this is the same relationship needed to insure that the two shaded areas in FIG. 13a are equal for a 50% duty ratio thus independently confirming the above general analysis. This also confirms an important practical result. The capacitor's rms current is only 11% higher than the rms value of the square-wave like current, which has minimum rms value. General equation (23) can be then used to define the capacitor's current waveform and switch currents for different duty ratios such as D=0.33 and D=0.67 of FIG. 13b and FIG. 13c.

Detailed Analysis of the Isolated Converter

Figure 14A:
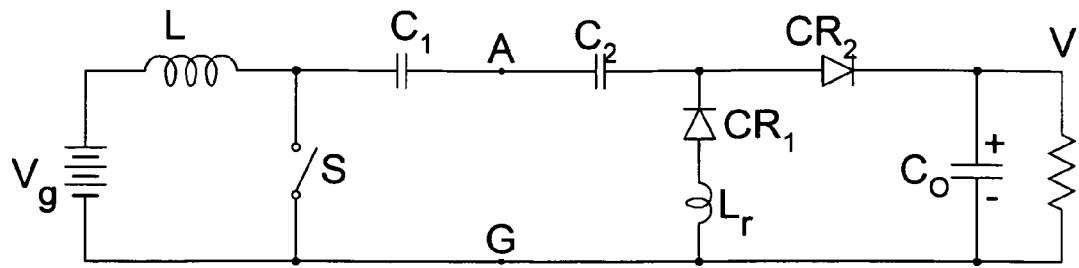
FIG. 14a illustrates a converter of FIG. 5a with two capacitors in series.
Figure 14B:
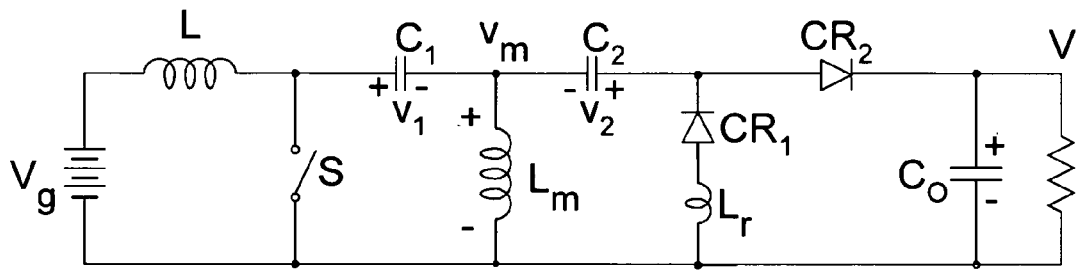
FIG. 14b illustrates insertion of a magnetizing inductance $L_m$.
Figure 14C:
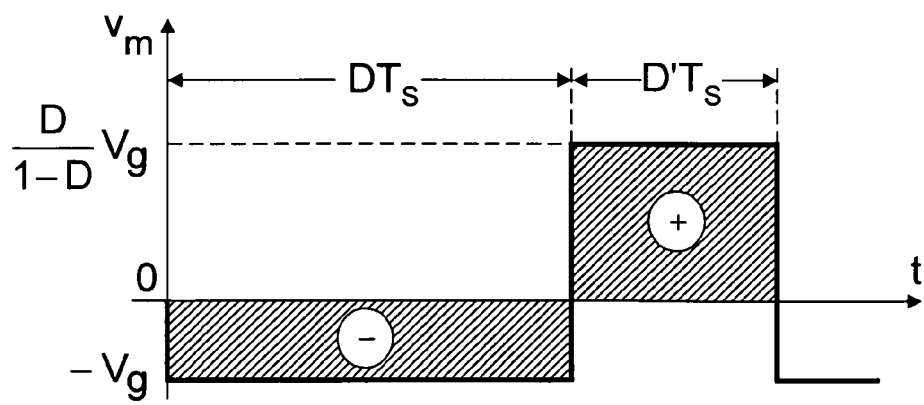
FIG. 14c illustrates volt-second balance on the magnetizing inductance of converter in FIG. 14b.

By splitting the capacitor C of FIG. 5a into two capacitors $C_1$ and $C_2$ in series as in FIG. 14a leads to natural placement of the transformer magnetizing inductance $L_m$ between nodes A and G such as in FIG. 14b. One can now easily prove that this inductance is Volt-second balanced. In the loop consisting of $V_g$, L, $L_m$, and $C_1$ this leads to $$V_1=V_g \quad (25)$$

as the sum of DC voltages around this loop must be zero (inductors are short in DC model).

The volt-sec balance imposed on magnetizing inductance $L_m$, imposes a reset voltage $V_C$ to be:

$$V_C=V_gD/(1-D) \quad (26)$$

During the interval $D'T_S$:

$$V_2=V-V_C=V_g \quad (27)$$

verifying that the two capacitor voltages in steady state $V_1$ and $V_2$ are from (25) and (27) equal to input DC voltage $V_g$ for any operating condition. This is to be expected for proper operation of the transformer as during ON-time interval both capacitors excite the transformer with the same steady state voltage $V_g$. Thus the actual time domain capacitor voltages $v_1$ and $v_2$ shown in FIG. 15a and FIG. 15b have the same common DC voltage $V_g$. Note, however, the actual opposing polarity of the voltages on two capacitors as designated in FIG. 14b. Thus, when capacitor $C_1$ is charging capacitor $C_2$ is discharging during OFF-interval, resulting in increasing ripple voltage of $C_1$ and simultaneously decreasing ripple voltage of $C_2$ as illustrated in FIG. 15a and FIG. 15b to result in a positive ripple voltage $\Delta v$ (FIG. 15c) at the beginning of ON-time interval.

Figure 11C:
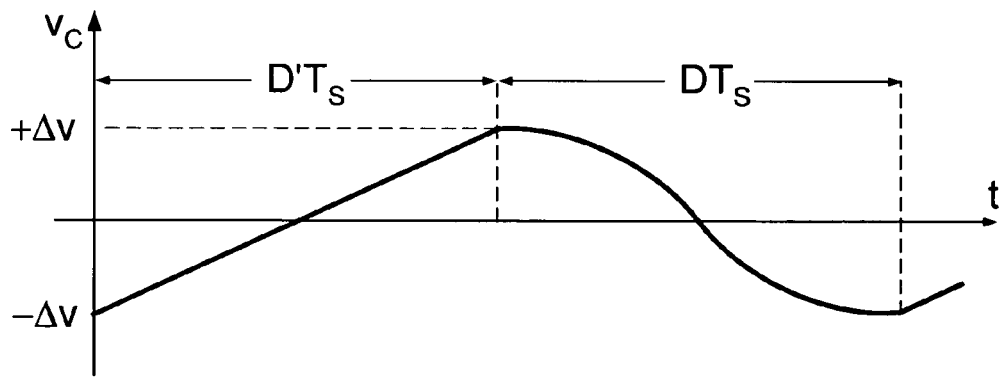
Figure 15A:
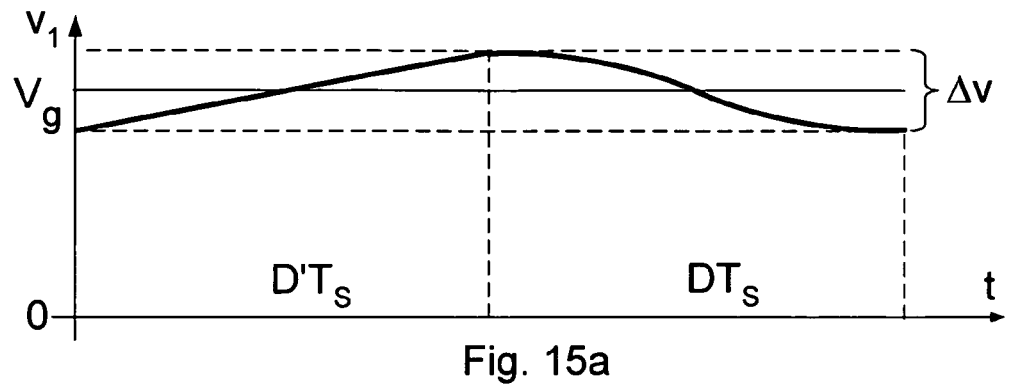
FIG. 15a illustrates voltage $v_1$ of capacitor $C_1$ in FIG. 14b.
Figure 15B:
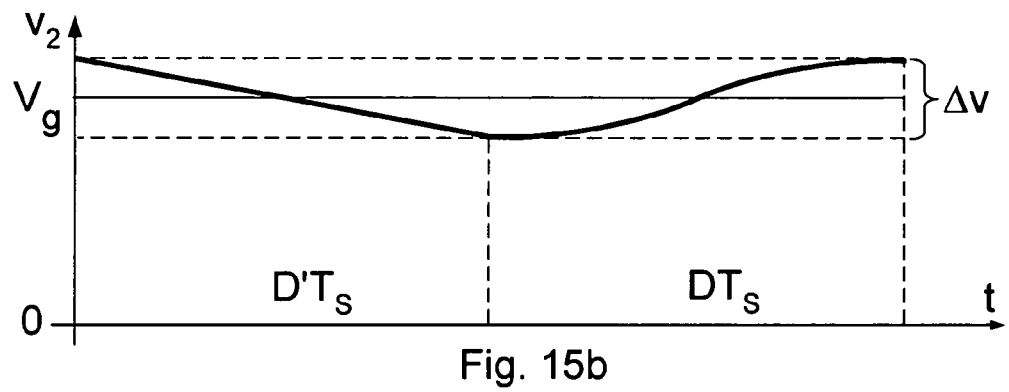
FIG. 15b illustrates voltage $v_2$ of capacitor $C_2$ in FIG. 14b.
Figure 15C:
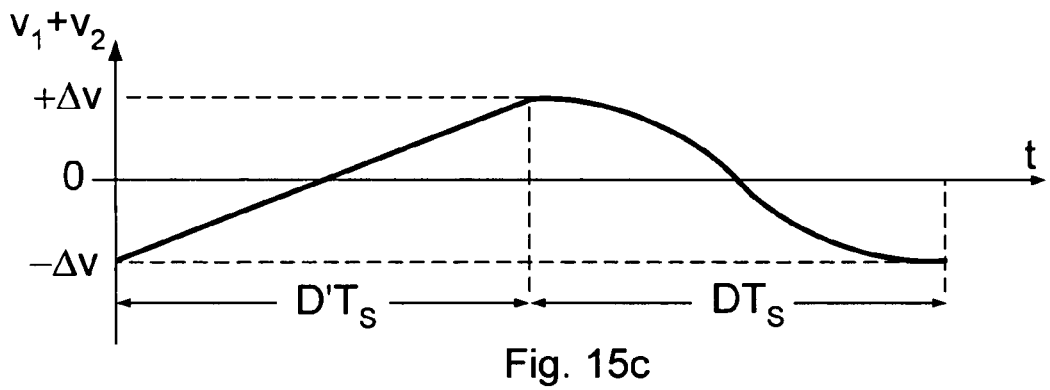
FIG. 15c illustrates difference of capacitor voltages $v_1$ and $v_2$.
Figure 15D:
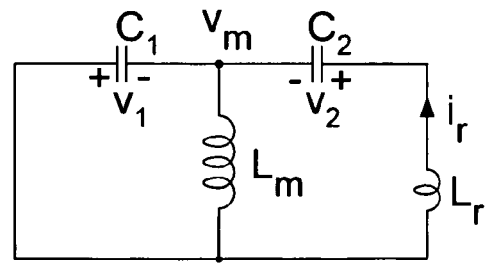
FIG. 15d illustrates the resonant circuit model for the converter of FIG. 14b.

Note that this ripple voltage $\Delta v$ is intentionally displayed large in FIG. 15a and FIG. 15b in order to clearly show the linear and sinusoidal change, where in practice this ripple voltage is only a fraction of the DC voltage $V_g$, as it represents typically only 5% to 10% of the DC value. The circuit model during the ON-time interval is again the resonant circuit of FIG. 15d. Note however, that despite large DC voltage level of each capacitor, the net voltage on two capacitors in series is their difference thus resulting in only an ac voltage mismatch of Δv as shown in FIG. 15c, which therefore leads to the same resonant converter analysis as for the non-isolated converter (see FIG. 11c). Once again, the resonant inductor $L_r$ presence insures that the small ripple voltage difference Δv between two capacitors is not dissipated in a lossy manner but instead circulated in a lossless manner as before. Clearly, the magnetizing inductance $L_m$ in FIG. 14b can be replaced by a two winding transformer to result in the isolated step-up converter of FIG. 7a.

Detailed Analysis of the Polarity-Inverting Converter

The polarity-inverting converter of FIG. 5c is now analyzed.

In the non-inverting case capacitor C had zero DC voltage and only AC ripple voltage on it. Note that in this case the capacitor C does have a DC voltage equal to output DC voltage so that $$V_C = V \qquad (28)$$

Figure 16A:
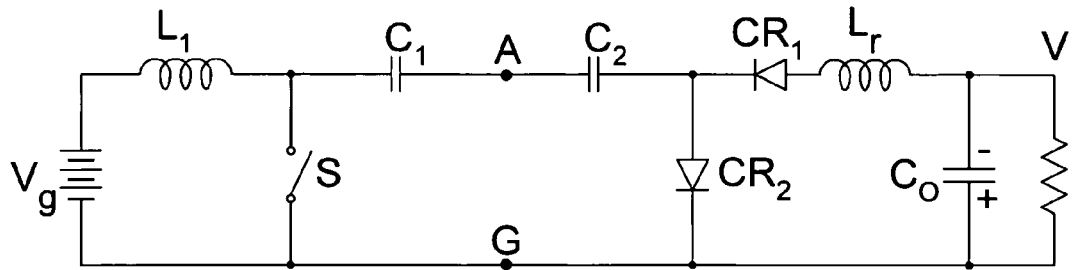
FIG. 16a illustrates a converter of FIG. 5b with two capacitors in series.
Figure 16B:
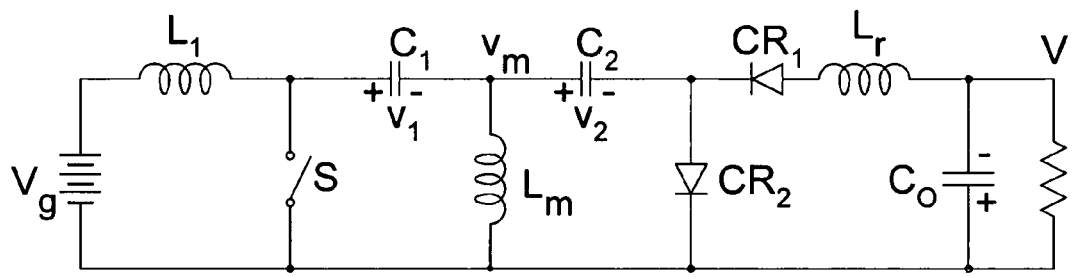
FIG. 16b illustrates insertion of a magnetizing inductance in the converter of FIG. 16a, FIG. 16c illustrates a volt-second balance on the magnetizing inductance of converter in FIG. 16b.
Figure 16C:
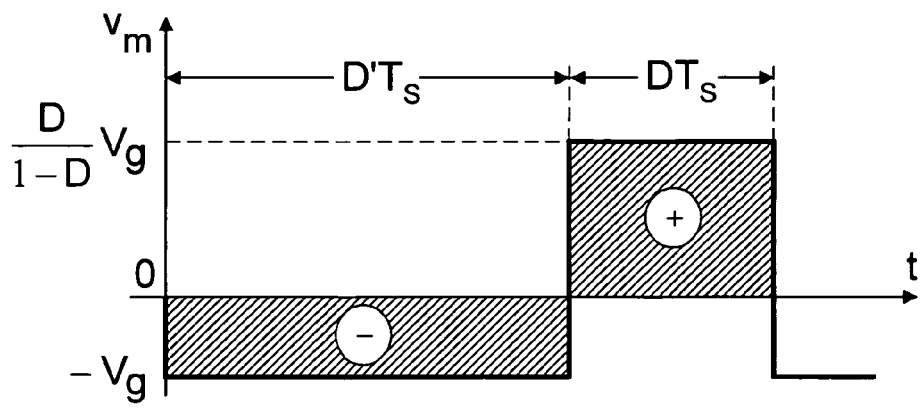
Figure 17A:
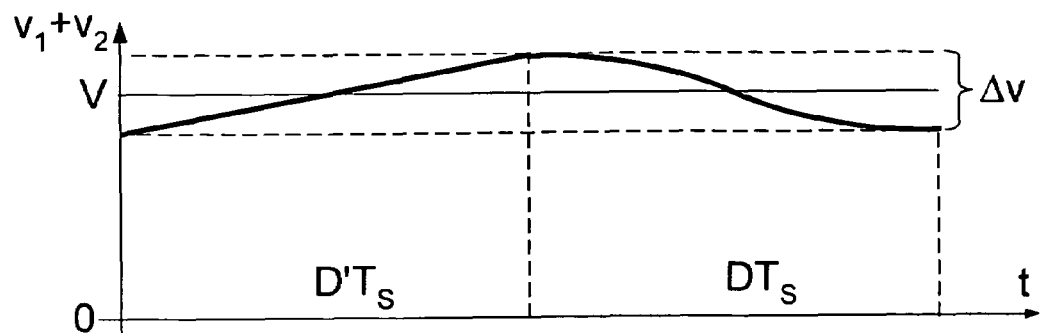
FIG. 17a illustrates a sum of the capacitors voltages $v_1$ and $v_2$ of FIG. 16b.
Figure 17B:
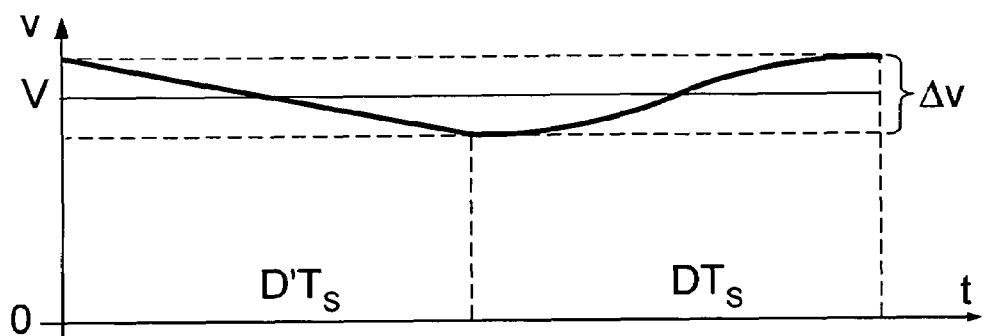
FIG. 17b illustrates the output capacitor voltage v of FIG. 16b.
Figure 17C:
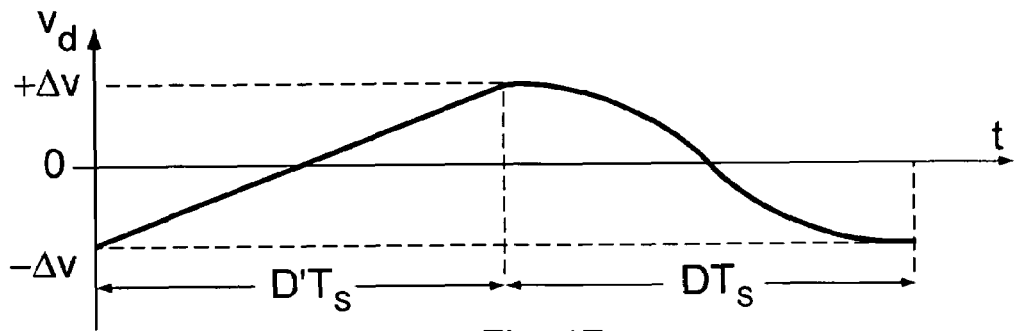
FIG. 17c illustrates the difference voltage $v_d$ of output capacitor voltage and sum of capacitors voltages $v_1$ and $v_2$.

This is apparently the penalty, which must be paid for getting polarity-inverting configuration. Once this capacitor is split into two capacitors in series as in FIG. 16a the converter with magnetizing inductance $L_m$ of FIG. 16b is obtained in which:

$$V_1 = V_g \qquad (29)$$

$$V_2 = DV_g/(1-D) \qquad (30)$$

once again leading to automatic volt second balance on the transformer as seen in FIG. 16c. Note this time the same positive polarities of two capacitor voltages $V_1$ and $V_2$, so that both of them are charging at the same time during OFF-time interval. However, it is now the output capacitor $C_0$, which discharges during the OFF-time interval as illustrated by the waveforms $v_1 + v_2$ of FIGS. 17a and v of FIG. 17b. Once again they have common DC voltage level V, so that their difference is once again just the ripple voltage mismatch Δv of FIG. 17c, which leads to the resonant circuit of FIG. 17d for which:

$$V_d = V_1 + V_2 - V = 0 \qquad (31)$$

Figure 17D:
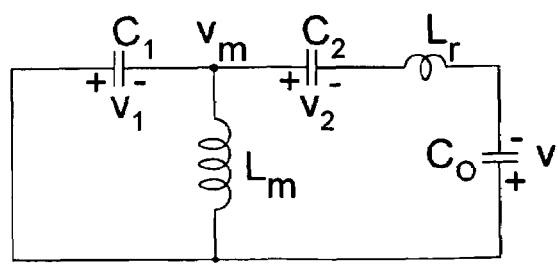
FIG. 17d illustrates the resonant circuit model for the converter of FIG. 16b.

The relationship (31) signifies again that in the resonant circuit model of FIG. 17d simplified by eliminating magnetizing inductance $L_m$ there is no net DC voltage in the resonant loop. This directly leads to only a small co-sinusoidal resonant voltage with amplitude Δv and therefore the voltage stress levels of all three switches are maintained the same despite the large resonant current magnitude during ON-time period.

Finally, by replacing the magnetizing inductance of FIG. 16b with the two-winding transformer an isolated version is obtained as in FIG. 7b.

Comparison of the Transformer Operations

Figure 18A:
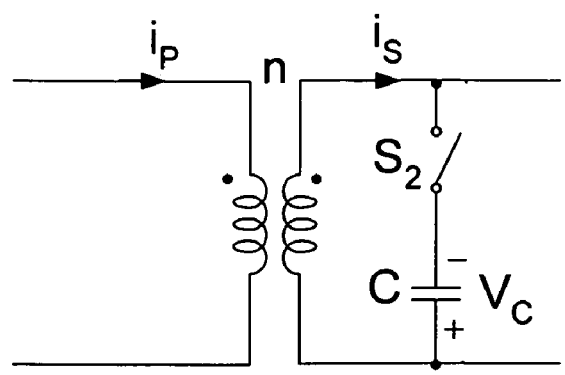
Figure 18B:
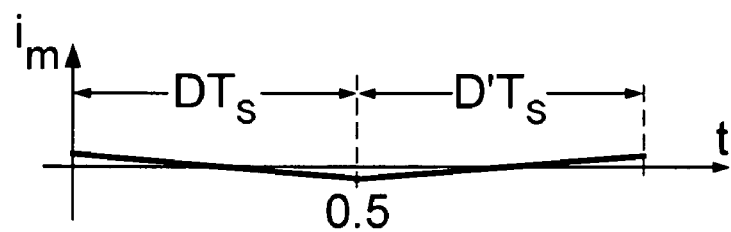

The transformer of the prior art isolated boost converter of FIG. 3a is highlighted in FIG. 18a with its voltage clamp reset circuit shown on secondary side. In this transformer, the power transfer between input and output takes part only during the OFF-time interval, when both primary and secondary windings conduct the current. During ON-time interval, the secondary clamp circuit is used to reset the core and conducts reset current. The complete transformer magnetizing current including reset current during On-time interval shown in FIG. 18b is triangular and small since transformer has no DC-bias and hence has a large magnetizing inductance.

Figure 19A:
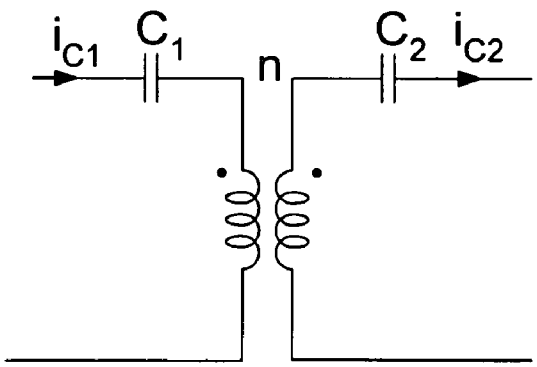
Figure 19B:
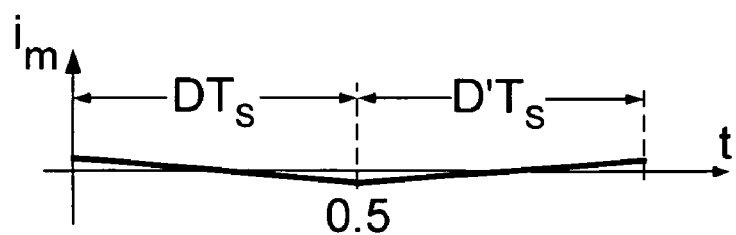

Transformer of both non-inverting and inverting variants of the present invention is highlighted in FIG. 19a. This transformer conducts the current during both intervals and results in best utilization of the windings, which transfer power all the time. Furthermore this transformer does not need a voltage clamp reset circuit as the transformer is automatically volt-second balanced by two capacitors $C_1$ and $C_2$. Thus, in this configuration, there is no need for additional clamp capacitor and additional switch on secondary side as in the converter of FIG. 3a. The two capacitors $C_1$ and $C_2$ perform also the additional function of charge balance (current-second balance) on both primary and secondary side of the transformer. Therefore, there is no net DC current flowing into either primary or secondary winding of the transformer, thus no DC-bias. Therefore the transformer can be built on an un-gapped magnetic core-resulting in large magnetizing inductance and small magnetizing current as also shown in FIG. 19b. Due to square-wave voltage excitations, the magnetizing current once again has a typical triangular current wave-shape.

Transformer Design

Figure 20:
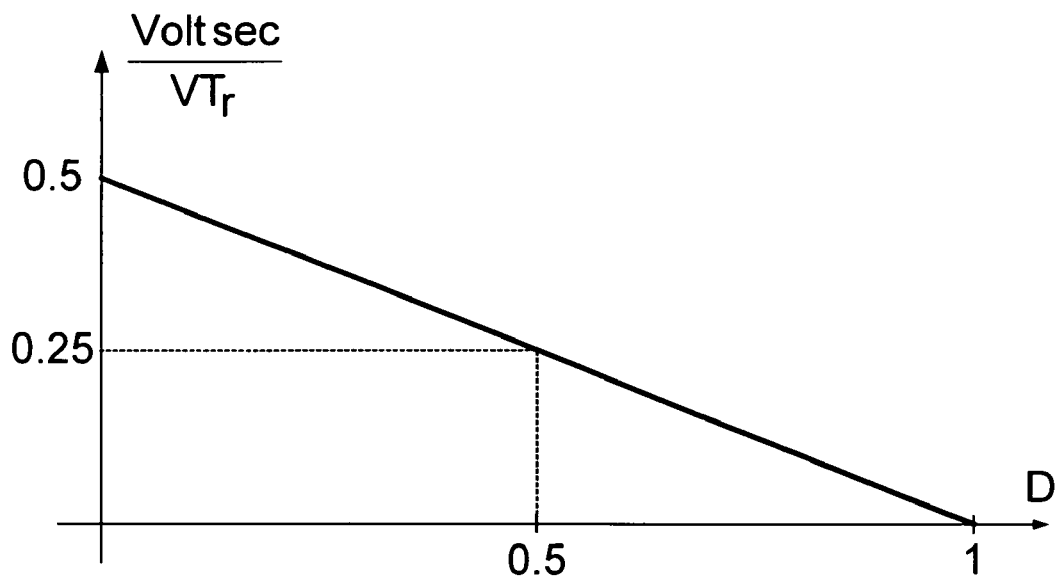

Both variants of the isolated converter have a very desirable low volt-seconds on the transformer as seen from the volt-second balance graph on FIG. 20 defined by:

$$\text{Volt-Second}/VT_r = \frac{1}{2}(1-D) \qquad (32)$$

which is expressed in terms of the constant regulated output voltage V and constant resonant period $T_r$ and duty ratio D. The highest volt-seconds are equal to 0.5 at D=0 compared to typical 1.0 lowest possible in most other switching converters. In fact for higher duty ratios and higher output voltages even lower volt-seconds are achieved. Therefore small and compact size of the isolation transformer for high voltage step-up can be made due to low flux density governed by (32). Another factor contributes to its small size: the transformer has no DC bias, resulting in an un-gapped core implementation with high magnetizing inductance and low magnetizing current.

Integrated Magnetics Extension

Figure 21A:
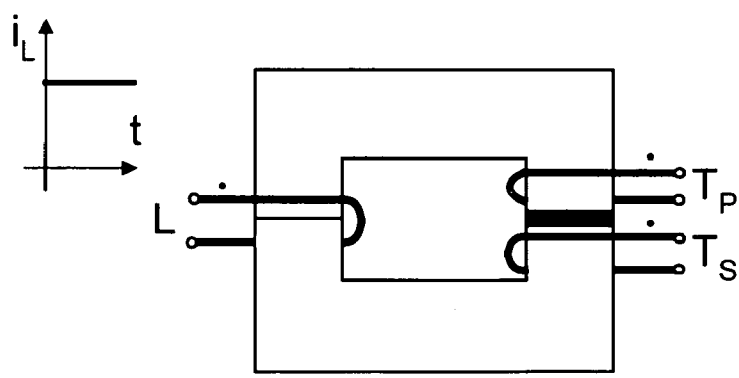
FIG. 21a illustrates the Integrated Magnetic structure with inductor and transformer of FIG. 7a on the common UU-like core.
Figure 21B:
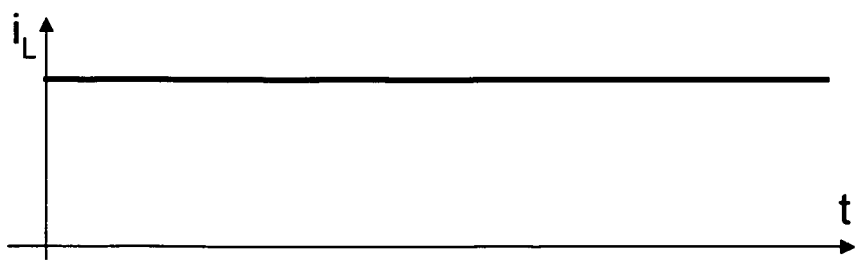

From the circuit in FIG. 14b and FIG. 16b, it is clear that input inductor has the identical AC voltage as the transformer magnetizing inductance. Hence the transformer and input inductor can be combined on a single Integrated Magnetics structure of the UU-core type shown in FIG. 21a following method outlined in Ref. 2 and Ref. 8. As demonstrated in Ref. 8 integration of magnetics results in further size reduction and core loss reduction, while at the same time improving the input ripple current, which with proper design can be made even ripple-free, despite finite core inductance, as illustrated in zero input ripple current waveform of FIG. 21b.

Resonant Inductor Design Considerations

The size of resonant inductor is rather small, due to the fact that the resonant inductor is subject to the very small AC ripple voltage Δv (such as the one illustrated in FIG. 15c), which is only a fraction of the steady-state input voltage $V_g$ present on capacitors $C_1$ and $C_2$. Furthermore, the needed resonant inductor value is small since the resonant frequency is high and on the order of to switching frequency.

A practical design example best illustrates the small size of resonant inductor. For a typical design:

P=400 W; $V_g$=200V; V=400V; $T_{ON}$=6 μs; $T_{OFF}$=6 μs; Δv=10V; $L_r$=μH; C=0.6 μF the RM5 core is selected having 24 mm² cross-section and 4 turns of wire, resulting in peak AC flux density of 0.16 T for a 3 A peak AC current. The power loss of resonant inductor is negligible.

Experimental Verifications and Salient Waveforms

Figure 22A:
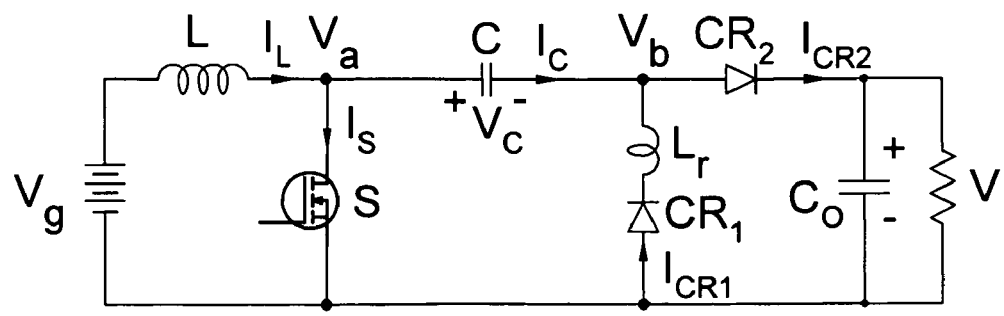
FIG. 22a is a circuit of an experimental model.
Figure 22B:
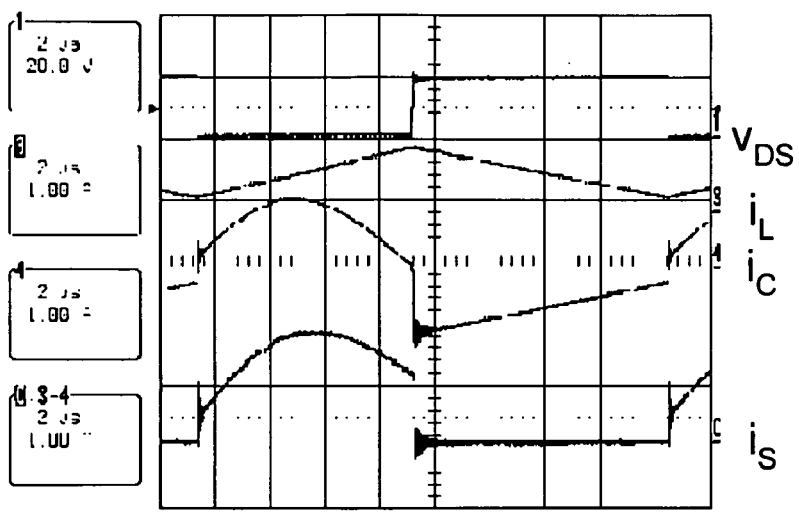
FIG. 22b illustrates the salient waveforms of experimental model under full load conditions.

The salient waveforms of the present invention are confirmed first on an experimental prototype of a non-isolated, non-inverting converter of FIG. 22a for a 10V to 20V step-up and low power of 10 W. The capacitor C current in FIG. 22b for full load confirms that the rectifier $CR_1$ current is sinusoidal and that it is zero at both ends of the ON-time interval. It also confirms that the input switch current is the sum of triangular input inductor current and resonant rectifier $CR_1$ current so that:

$$i_S = i_L + i_{CR1} \quad (33)$$

Figure 22C:
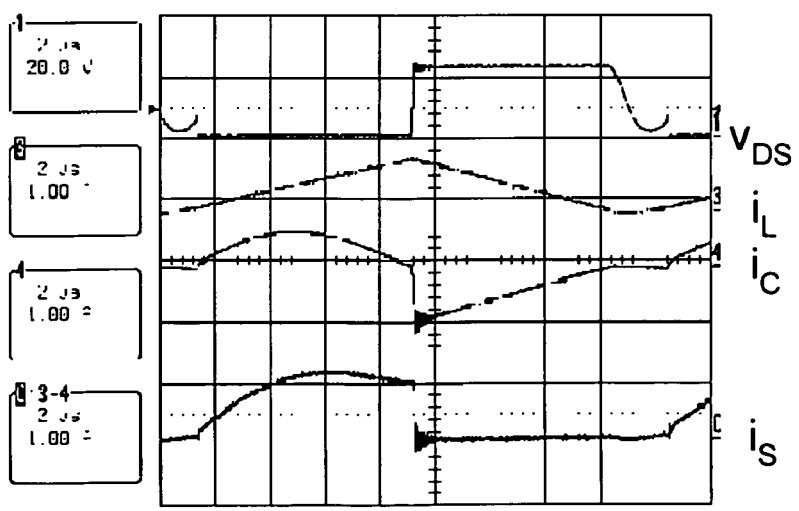
FIG. 22c illustrates the discontinuous inductor current mode of experimental model at light load.

When the converter operates at light load it enters the discontinuous inductor current mode similar to PWM converters, which is characterized by zero inductor L current and zero capacitor C current during the last part of the OFF-time (PWM) interval such as seen in FIG. 22c. Parasitic elements then also cause the typical ringing seen in the drain-to-source voltage $V_{DS}$ Of the main switch in FIG. 22c.

Figure 23A:
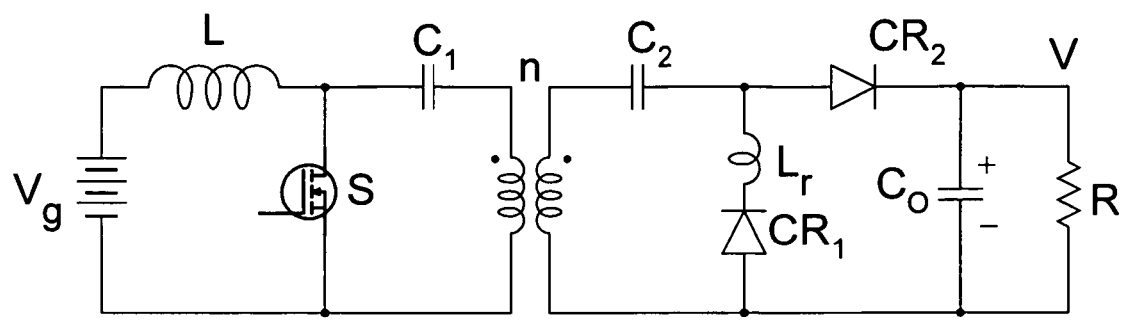
FIG. 23a illustrates the experimental isolated prototype circuit.
Figure 23B:
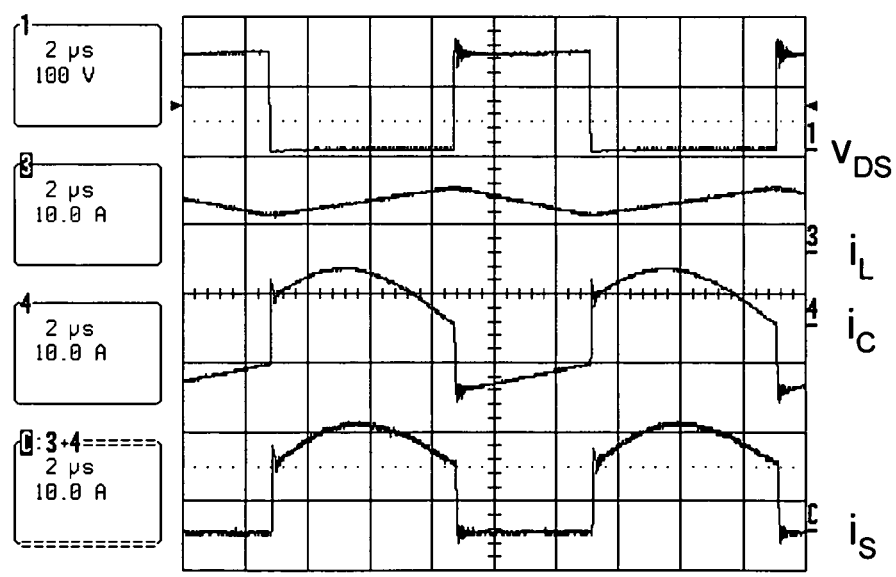
FIG. 23b illustrates the salient waveforms of the experimental prototype under full load conditions.
Figure 24A:
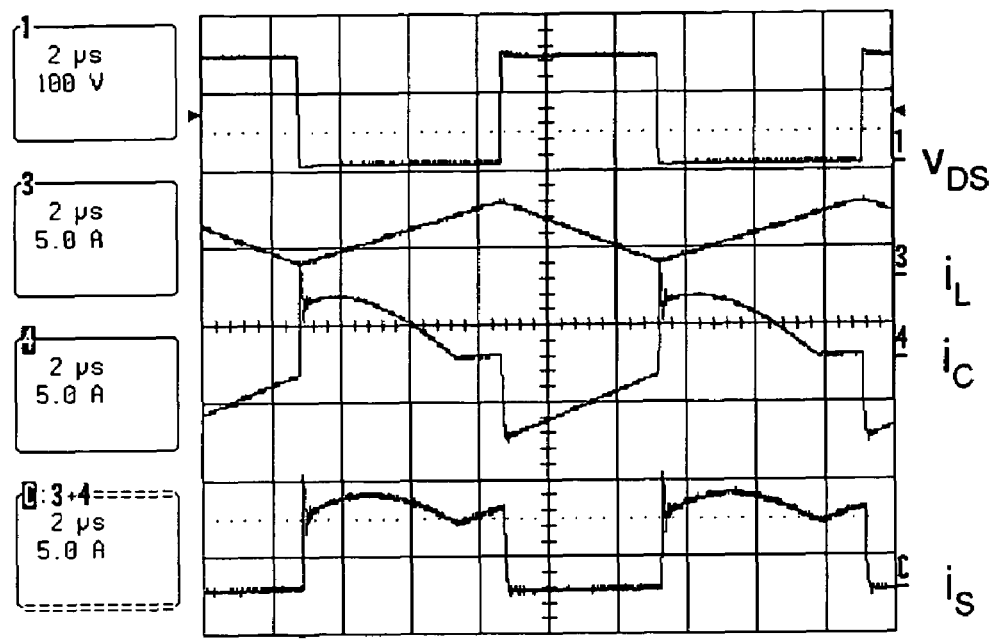
FIG. 24a illustrates the salient waveforms of the experimental prototype for the operation under 50% load current.
Figure 24B:
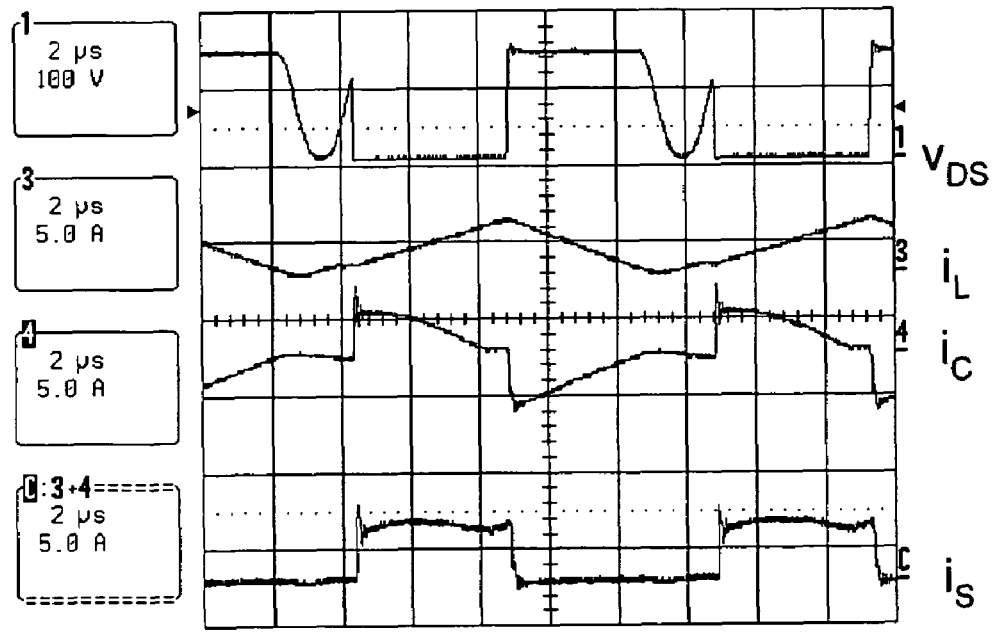
FIG. 24b illustrates the salient waveforms of the experimental prototype under light load and with discontinuous inductor current mode.

The experimental prototype of an isolated 450 W converter with a nominal 60V to 400V step-up is then made to verify operation at high power and high voltage step-up and is shown in FIG. 23a. The respective voltage and current waveforms are shown in FIG. 23b for full load, FIG. 24a for a 50% load, and FIG. 24b for a light load of 15%. The main switch S current has desirable feature that it has low turn-ON and low turn-OFF current since the maximum resonant part is in the center of the ON-time interval. From capacitor C current in FIG. 23b, the resonant current is not any more zero at the start of ON-time interval. This is caused by a number of second order effects, such as leakage inductance of the transformer, parasitic capacitance of the $CR_1$ diode and added spike filtering circuitry on secondary side $CR_1$ branch. Apart from modifying the waveforms at the beginning of ON-time interval, there are no undesirable effects upon converter performance. The only other visible effect is that at light load (FIG. 24a), the resonant current is depleted before end of ON-time interval, so that input switch current shows clearly its triangular inductor current rise as resonant current is reduced to zero at that point and stays zero until end of ON-time interval. As discussed previously, at light load, the converter goes into discontinuous inductor current mode characterized by waveforms of FIG. 24b displaying the characteristic drain-to-source voltage waveform $V_{DS}$ as in FIG. 24b.

Efficiency Verification

Figure 25A:
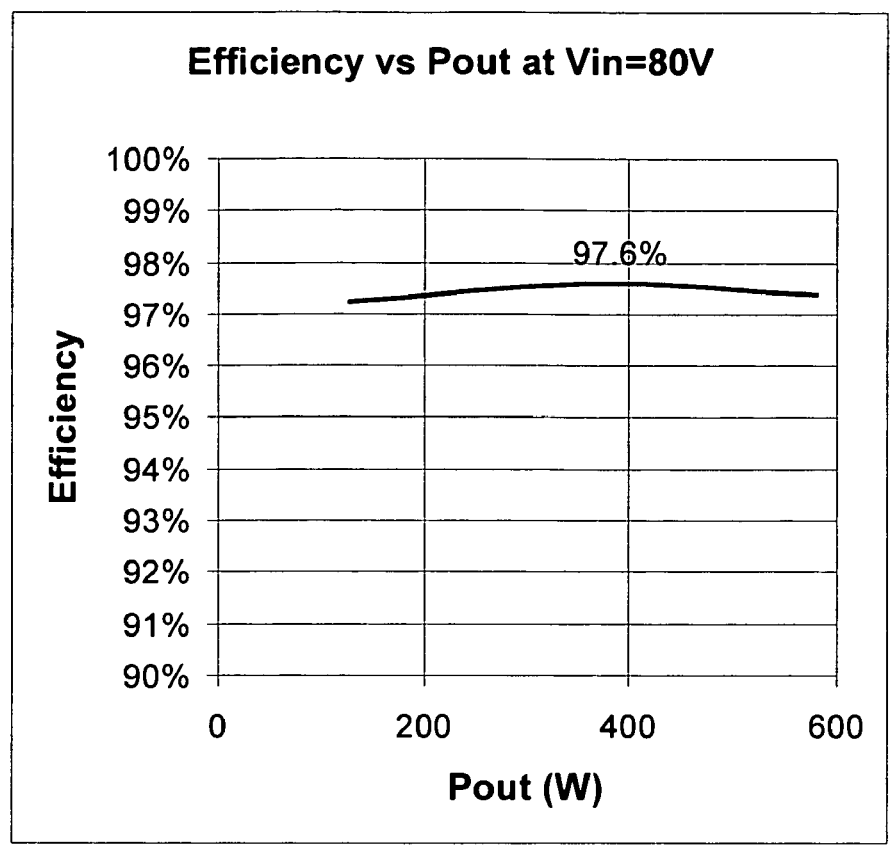
FIG. 25a illustrates the efficiency measurements of the experimental prototype as a function of the output power change.
Figure 25B:
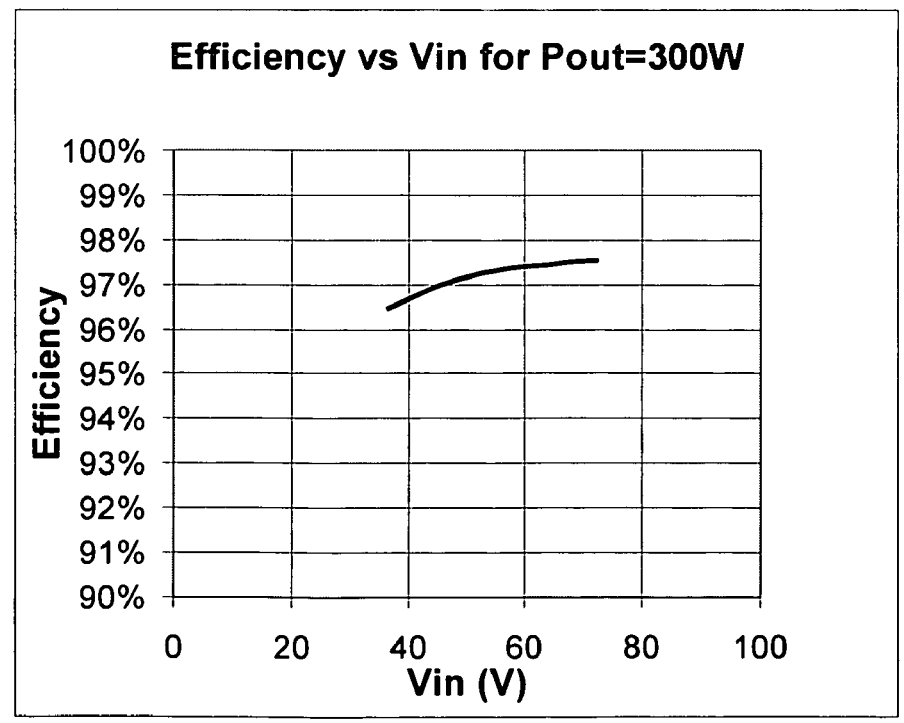
FIG. 25b illustrates the efficiency measurements of the experimental prototype at 300 W as a function of input voltage.

The efficiency performance of the 450 W prototype has been tested and results are displayed in FIG. 25a for a wide range of output power with high efficiency of 97.6%. FIG. 25b shows efficiency at 350 W load over a range of input voltages.

Converter Start-Up Operation

Operation at Low Duty Ratios and Light Load

Figure 26A:
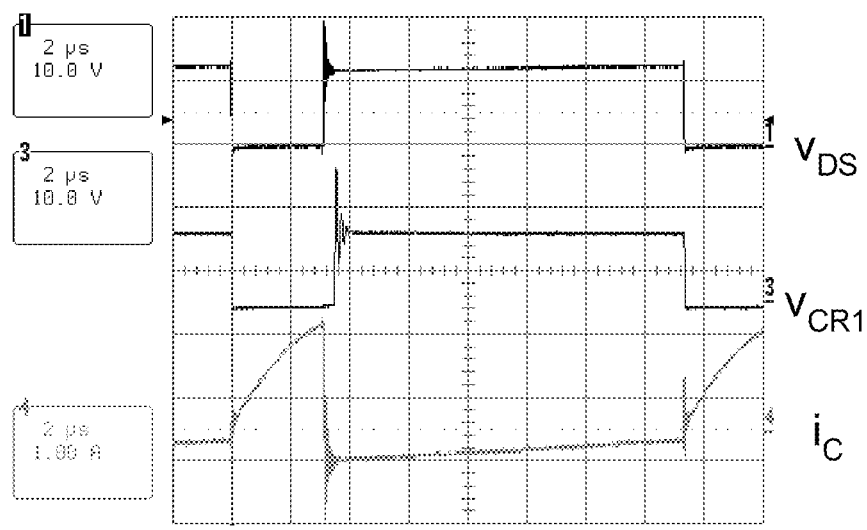
FIG. 26a illustrates the salient waveforms of the experimental prototype for operation at low duty ratios and light load at converter start-up.
Figure 26B:
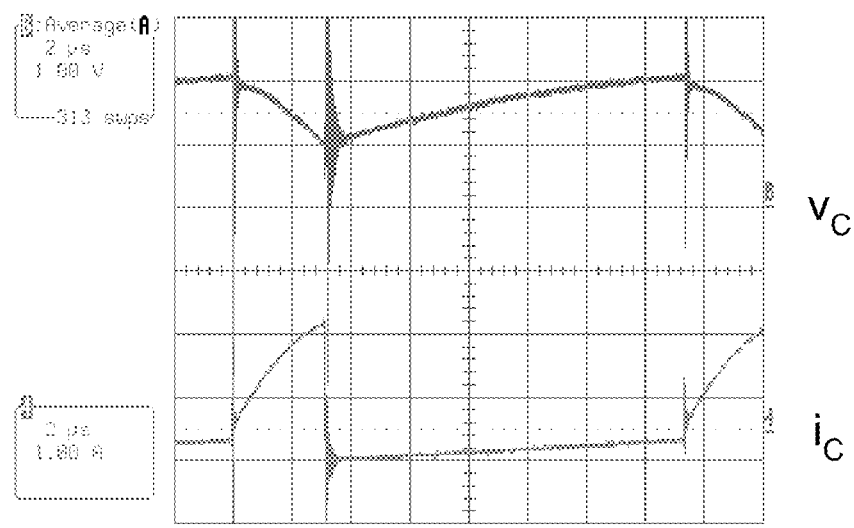
FIG. 26b illustrates DC voltage and current waveforms of the experimental prototype on capacitor C at low duty ratios.
Figure 26C:
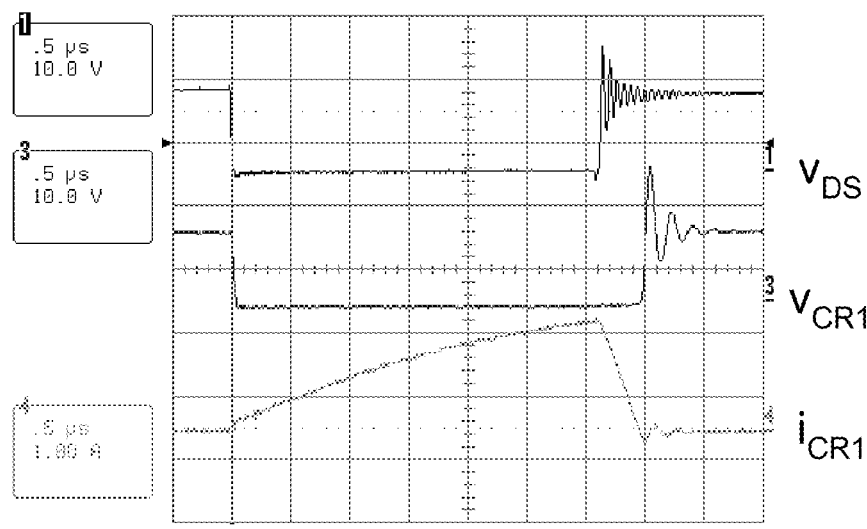
FIG. 26c illustrates enlarged ON-time interval to highlight the conduction of $CR_1$ rectifier after main switch S is turned-OFF resulting in linear reduction of its current until it is turned-OFF.

To explain the step-down property at low duty ratios the experimental converter of FIG. 22a is built and operated under the following conditions:

$$f_s=64 \text{ kHz}; T_{ON}=7.5 \text{ } \mu\text{sec}; D=0.2; V_g=9.9V; \\ V_{out}=19.2V; I=0.23 A \quad (34)$$

and the waveforms of FIG. 26a, FIG. 26b, and FIG. 26c are obtained.

At low duty ratio, the capacitor C does not have time to discharge to zero value. As the available discharge time is too short, a DC voltage $V_C$ builds up on this capacitor at the expense of the reduced DC voltage V on the output capacitor so that their sum is approximately preserved. This increases the initial condition (10) to $V_C+\Delta v$ (note that $V_C$ is no longer zero) and results in proportionally increased peak resonant current $I_P$ as seen in FIG. 26a. Note that capacitor C now has a DC voltage of $V_C=1.8V$ as seen in waveform of FIG. 26b. This results in reduced output DC voltage. The reduced output voltage V, in turn, leads to longer linear discharge of the resonant inductor as seen in enlarged ON-time interval in FIG. 26c. As a result the time that both diodes are conducting simultaneously is made longer.

Figure 27A:
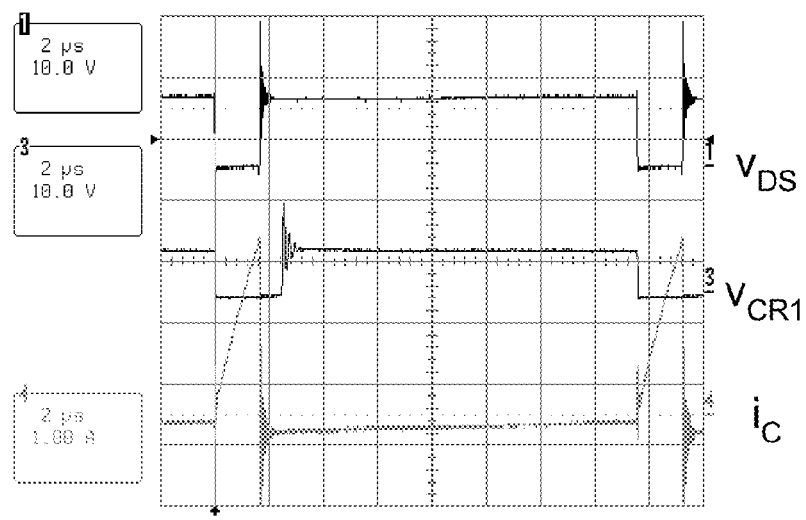
FIG. 27a illustrates the salient waveforms of the experimental prototype for operation at further reduced duty ratio, which results in higher resonant peak current.
Figure 27B:
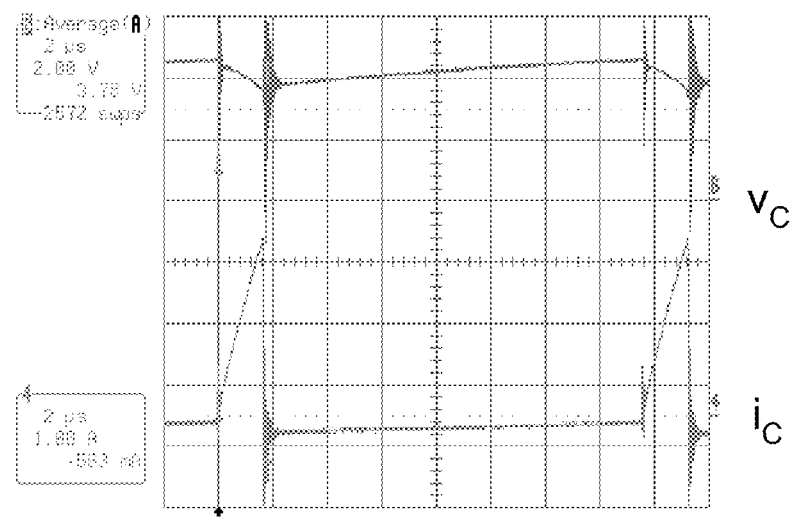
FIG. 27b illustrates DC voltage and current waveforms on capacitor C.
Figure 27C:
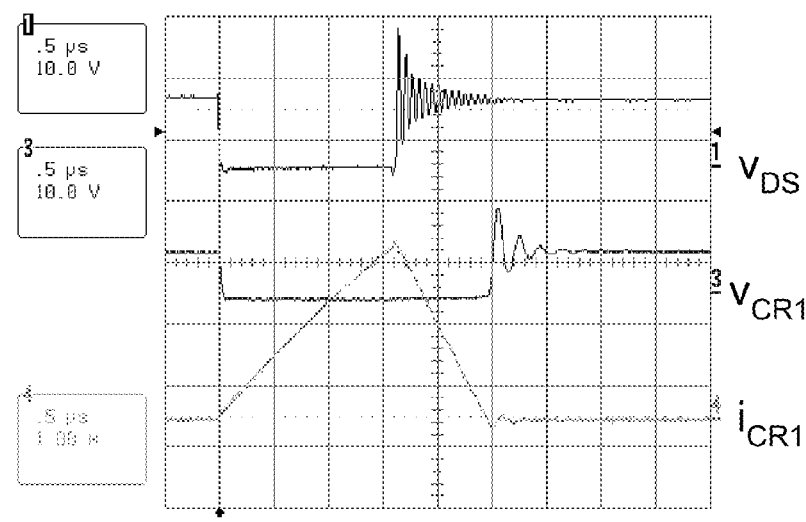
FIG. 27c illustrates waveforms of the experimental prototype during enlarged ON-time interval.

Further reduction of the duty ratio to D=0.12 ($T_{ON}$=1.8 µsec) results in the waveforms of FIG. 27a, FIG. 27b and FIG. 27c. Note that the DC voltage of capacitor C is now increased to 6.6V as seen in waveform of FIG. 27b, which led to increased peak resonant current. The output capacitor voltage was measured to be 4V so that the total sum of the two DC voltages is 10.6V, almost the same as it was at D=0.2 confirming the redistribution of the DC voltages between the capacitor C and output capacitor voltage $C_0$. Most importantly, this demonstrates an effective overall step-down of input DC voltage of 9.9V to 4V output voltage. FIG. 27b shows that capacitor C current stops the conduction after main switch S is turned OFF, while FIG. 27c shows that the diode $CR_1$ is still conducting for an additional time needed for resonant inductor current to discharge to zero current level and turn $CR_1$ diode OFF. As the output voltage is now even lower at 4V compared to previous 10.5V, the discharge slope is slower and discharge time longer. Further reduction of the duty ratio leads to further reduction of the output DC voltage and corresponding increase of the capacitor C voltage for even bigger step-down. Therefore, the smaller duty ratio, the higher would be the peak current and current stresses on the main switch.

Start-Up with Increased Switching Frequency

Figure 28A:
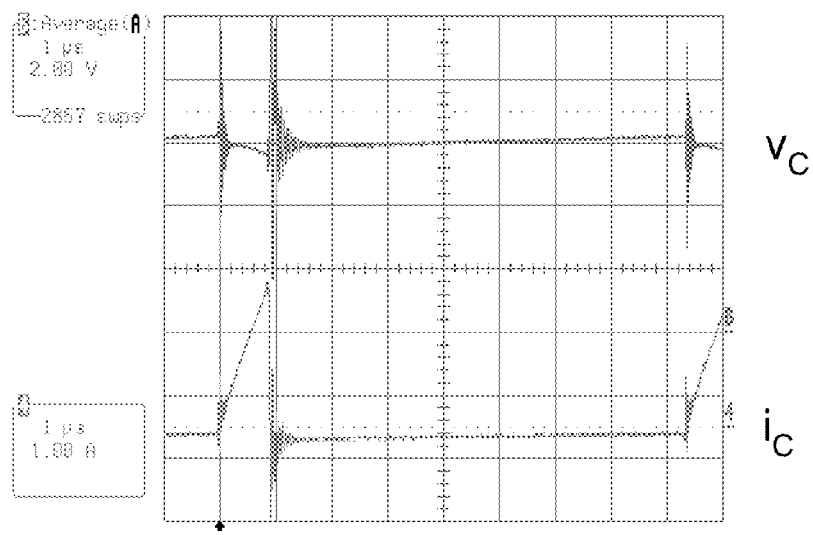
FIG. 28a illustrates capacitor voltage and current waveforms with reduced peak current obtained by increased switching frequency to 120 kHz.
Figure 28B:
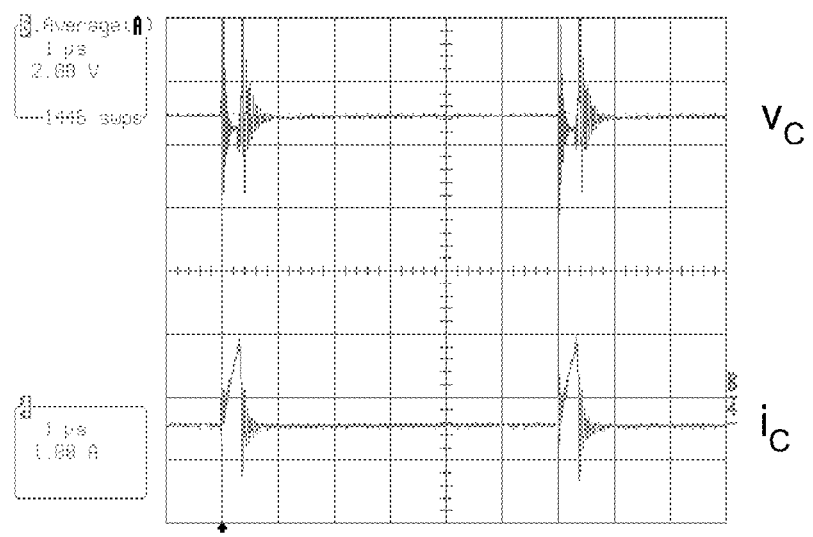
FIG. 28b illustrates further reduced peak current and lower effective duty ratio by increase of switching frequency to 166 kHz.

This potential problem of high current stresses at the start-up can be alleviated very effectively by choosing to increase switching frequency as illustrated in FIG. 28a and FIG. 28b. Increasing switching frequency to 120 kHz and keeping ON-time of 0.9 msec has the effect of reduced effective duty ratio D=0.12 and results in reduced peak current of the switch S and output voltage of 4.7V. The capacitor C voltage is now 6V so that sum of two voltages is again 10.7V. Therefore, once the converter enters into this step-down region the sum of two capacitor voltages is maintained nearly constant and higher than the input 9.9V.

Finally, the switching frequency is increased to 165 kHz and ON-time is reduced to 0.35 µsec for an effective duty ratio D=0.06 to result in the waveforms of FIG. 28b. The output voltage is measured to be V=1.3V for an overall step-down of 7.5, while the capacitor C voltage is $V_C$=9V, so their sum is 10.3V. Note further reduction of the switch S peak current.

Therefore, increase of the switching frequency is a very effective method to operate the converter in this step-down region to achieve a smooth and gradual increase of the output voltage from zero to just above the input DC voltage. In addition to an effective start-up, the perennial problem of the boost converter of FIG. 2a of having a high in-rush current is also much reduced if not eliminated.

The operation at increased switching frequency is used only during a very short start-up time of a few milliseconds when converter operates in the step-down region A shown in FIG. 6. Upon reaching the step-up region, nominal step-up operation is starts. The important feature is that this start-up procedure does not affect any of the other properties of the converter such as the voltage stresses on all three switches, which are preserved and the same as in step-up region B described earlier.

The isolated converters of FIG. 7a and FIG. 7b operate exactly in the same manner and exhibit a same step-down region A at low duty ratios. This is confirmed by repeating the above experiment but with the isolated converter of FIG. 23a.

This step-down region is therefore made possible by the presence of the energy transferring capacitors and the charge balance they impose which in turns leads to operation in Mode 3 and step-down region. The reduced output DC voltage is obtained at the expense of the increased voltage $V_C$ on capacitor C. Such step-down mode of operation does not exists in prior-art isolated boost converter of FIG. 3a, so that converter still has a start-up problem as its output voltage must be pre-charged to voltage level above the input DC voltage by some alternative means before it can even operate.

Evaluation of the RMS Current Stresses of the Three Switches

It was demonstrated that the voltage stresses of the three switches are much reduced from those seen by prior-art PWM converters. One might therefore expect that the rms current stresses of the three switches might be excessive. The detailed analysis presented here and illustrated for non-inverting converter of FIG. 5a demonstrates that this is not the case as the rms current stresses are shown to increase slowly over the wide input voltage operating range.

Figure 29A:
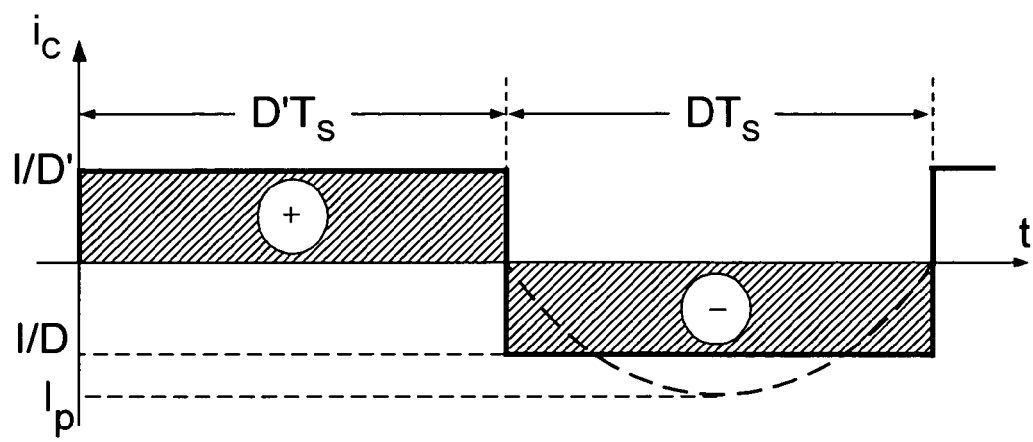
FIG. 29a illustrates the replacement of actual capacitor C current shown in dotted lines with an approximation useful for analytical evaluation of rms current of capacitor C and FIG. 29b illustrates the rms current of capacitor C as a function of operating duty ratio D and DC load current I.
Figure 29B:
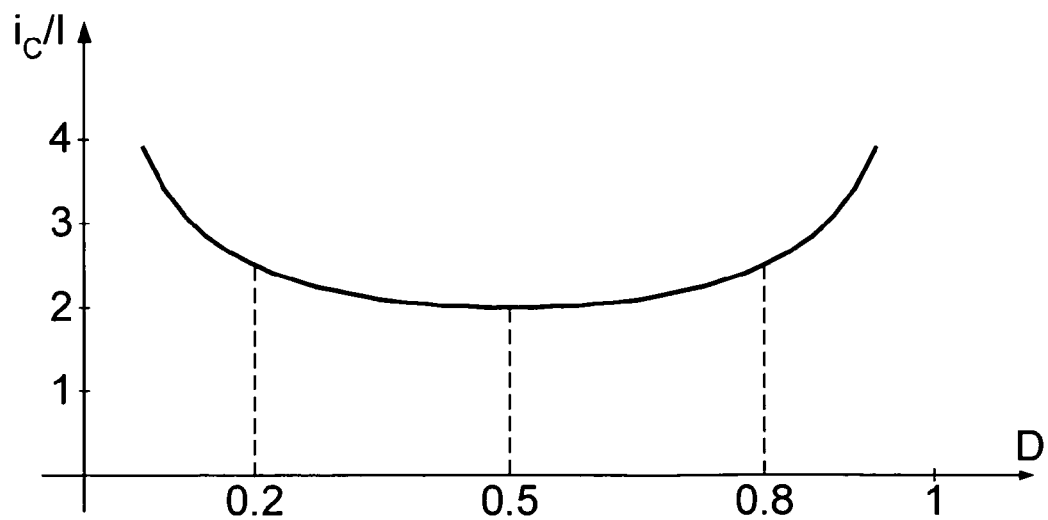

The presence of the capacitor C results in added rms current of capacitor C as well as corresponding additional losses due to presence of the resonant current in switch S and diode $CR_1$ during ON-time interval. In order to obtain a quantitative analytical result, we assume that the actual capacitor resonant sinusoidal current is during ON-time interval is converted into an equivalent square-wave current with the same area as illustrated in FIG. 29a. Under that assumption the rms current $I_{RMS}$ of capacitor C is evaluated as:

$$I_{RMS} = \frac{I}{\sqrt{D(1-D)}} \quad (35)$$

and shown graphically in FIG. 29b, where I is the DC load current. Thus, for a wide operating range of D=0.2 to D=0.8, (equivalent to 4:1 input voltage change), the rms current has increased from its minimum value of 2I at D=0.5 to 2.5I at D=0.2 and D=0.8 for an effective 25% increase. Therefore respective rms current losses will increase by a factor 1.56 at the extreme ends of the range.

To put this in perspective we compare these rms currents with that of the output $CR_2$ rectifier rms current at D=0.5, which is evaluated to be 1.41 I. Thus rms current of $CR_1$ rectifier with resonant current at D=0.5 is only 1.41 times higher than the $CR_2$ rectifier current. All conduction losses could be further reduced by use of the low ON-resistance MOSFETs when used as synchronous rectifiers.

Output Filtering of Inverting and Non-Inverting Configurations

Figure 30A:
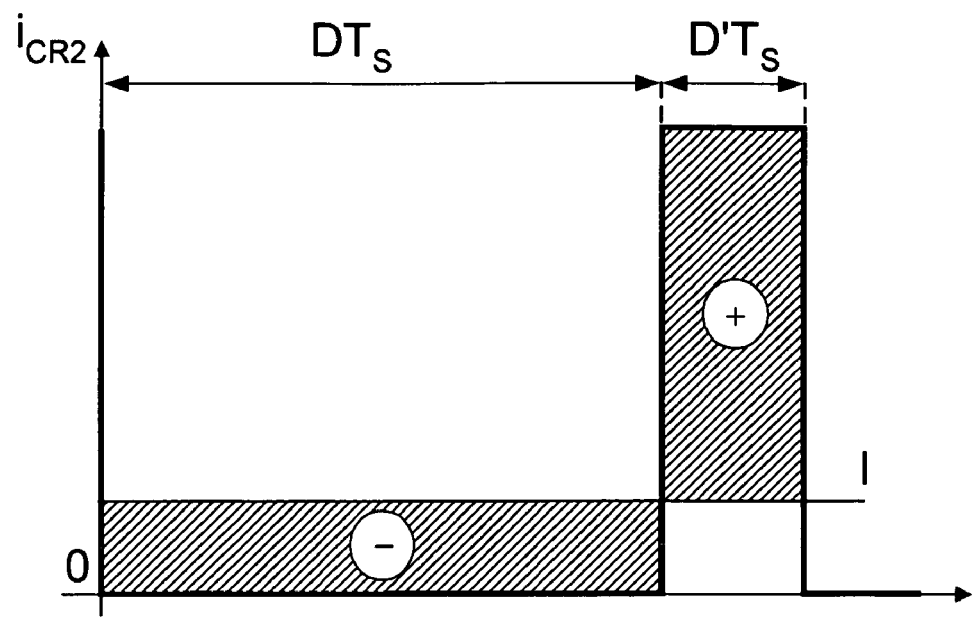
FIG. 30a illustrates the current of rectifier $CR_2$ of the converter in FIG. 5a operating at 0.8 duty ratio
Figure 30B:
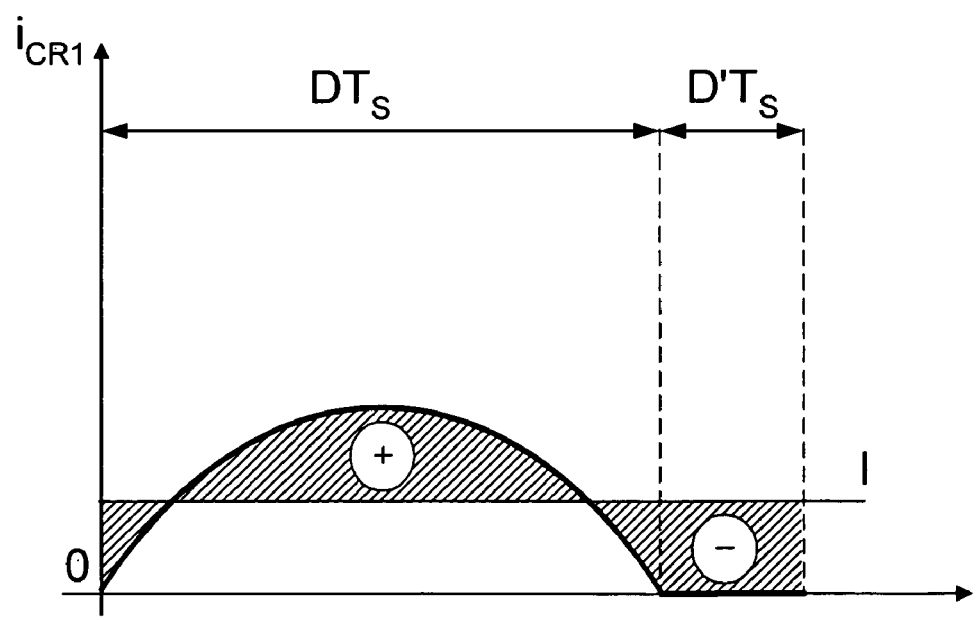
FIG. 30b illustrates current of rectifier $CR_1$ of the converter in FIG. 5b operating at 0.8 duty ratio.

There are fundamental differences in the output capacitor filtering requirements between the inverting and non-inverting configurations as illustrated in FIG. 30a and FIG. 30b by the pulsating rectifier currents feeding the load in the case of the high duty ratio D=0.8 and therefore high voltage step-up of 5, for the converters of FIG. 5a and FIG. 5b respectively.

The non-inverting converter feeds the load during the short OFF-time interval and thus results in a large magnitude short duration square-wave-like current pulse equal to four times the DC load current as shown in FIG. 30a, in which, shaded area represents the charges on capacitor $C_0$.

The inverting converter is, however, feeding a load with a resonant current whose peak at D=0.8 is approximately 2 times the DC load current I. The difference shown in shaded area in FIG. 30b represents the charge increase on the output capacitor $C_0$, and will result in corresponding output ripple voltage.

For inverting case for D=0.8, approximately two times less charge is needed than for non-inverting case, resulting in output capacitor reduced two times for the same output ripple voltage. More importantly, the rms current is also proportionally reduced for the inverting converter.

The situation regarding filtering is just the opposite for the case of the low duty ratio such as D=0.2 and a small step-up ratio of 1.25. In this case the roles are reversed and inverting converter needs more output capacitance and has appropriately increased rms current stress on output capacitors.

In conclusion, relative to output filtering requirements, polarity inverting converter is best suited for applications requiring large step-up (4 or more) while non-inverting is better suited for moderate to low voltage step-up below 2 or so. Clearly at D=0.5 both configurations have similar filtering requirements.

The Half-Bridge Rectifier Extension

Figure 31A:
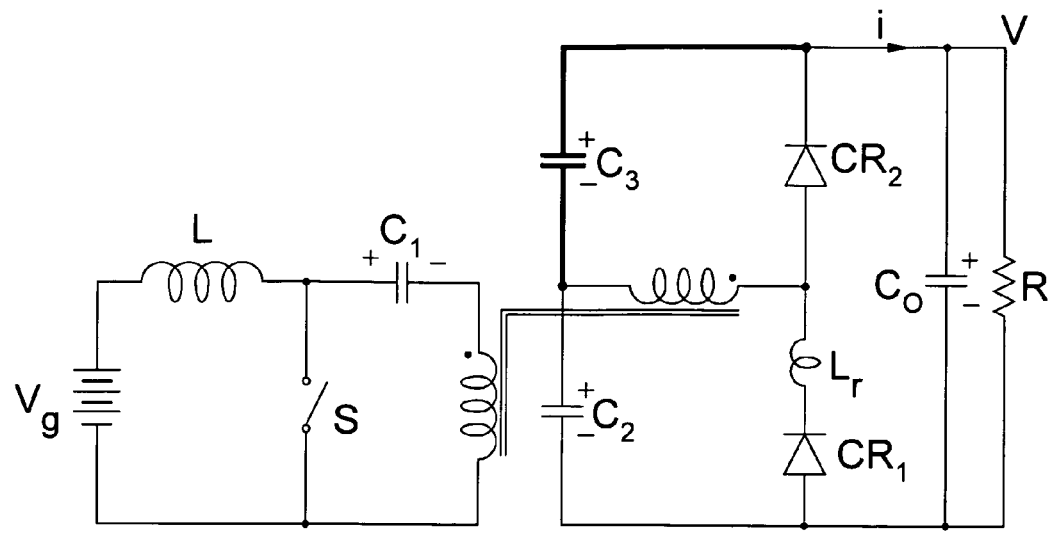
FIG. 31a illustrates the present invention converter of FIG. 7a with additional capacitor implementation for a half-bridge rectifier operation on output.

The secondary side can be configured as a half-bridge rectifier as illustrated in FIG. 31a. Note that the converter drawn in thin lines in FIG. 31a is identical to the original isolated converter of FIG. 7a except the floating capacitor $C_2$ is now grounded and the grounded transformer secondary is now floating. Therefore the addition of a third capacitor $C_3$ shown in bold in FIG. 31a on top of capacitor $C_2$ introduces the path for the current during OFF-time interval to flow into the output terminal.

The two voltages $V_2$ and $V_3$ on capacitors $C_2$ and $C_3$ have steady state DC voltages given by:

$$V_2 = V_g \quad (36)$$

and $$V_3 = V_g D/(1-D) \quad (37)$$

thus resulting in unchanged output DC voltage $V_g/(1-D)$ equal to the sum of (36) and (37).

The Full-bridge Rectifier Extension

Figure 31B:
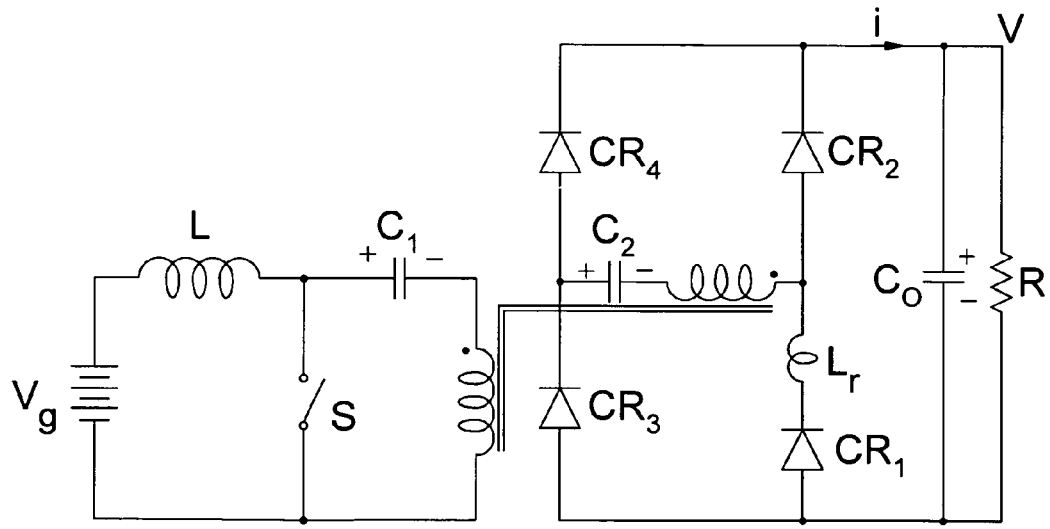
FIG. 31b illustrates the present invention converter of FIG. 7a implementation with a full bridge rectifier on output.
Figure 32A:
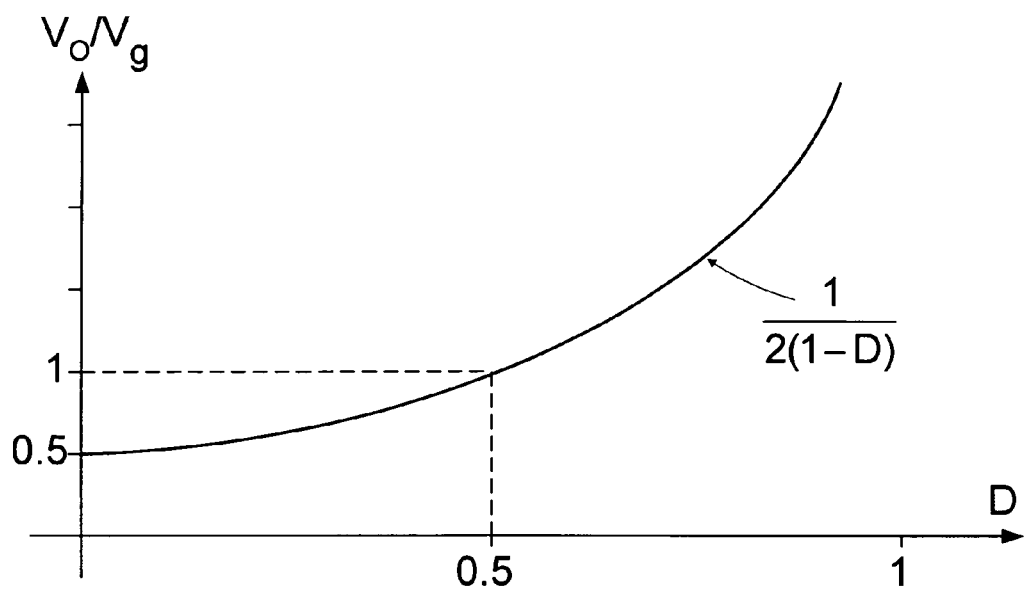
FIG. 32a illustrates the DC gain characteristic of the converter in FIG. 31b.

The secondary side can be configured as a full-bridge rectifier with four rectifiers as shown in FIG. 31b with the DC gain characteristic changed to the one shown in FIG. 32a for 1:1 transformer turns ratio and given by the analytical relationship:

$$V = \frac{1}{2} V_g/(1-D) \quad (38)$$

Note the factor ½, which results in the DC gain of 1 at duty ratio D=0.5 and conversion ratio of 0.5 at duty ratio D=0 leading to the two regions: step-down region from D=0 to D=0.5 and step-up region for D>0.5.

Figure 32B:
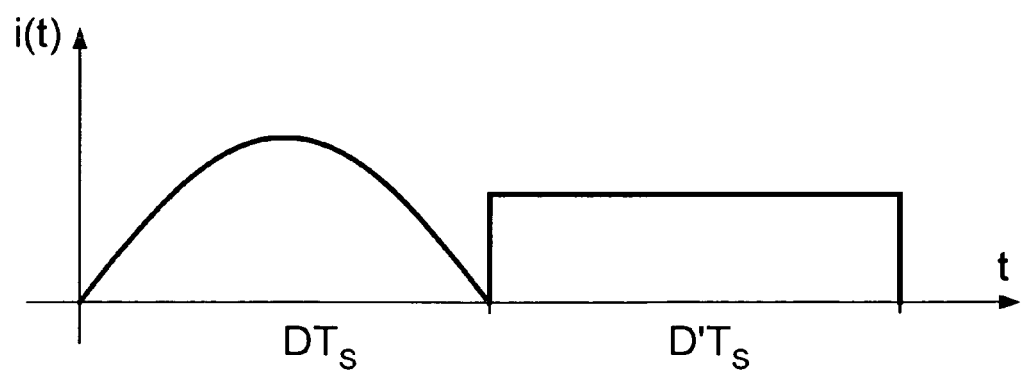
FIG. 32b illustrates the output current at D=0.5 for the full-bridge extension of FIG. 31b

The original configuration of FIG. 7a operated with the DC gain conversion of 1 at duty ratio of D=0. However, this operating region at small duty ratios is shown in graph of FIG. 29b to lead to exponentially increased rms currents and corresponding higher losses. The main benefit of this extension is that the output current at 50% duty ratio has current contribution from both rectifiers as seen in FIG. 32b resulting in much reduced output filtering requirements and without effecting other desirable properties of the original converter of FIG. 7a.

Another interesting feature is observed by calculating the steady state DC voltage $V_2$ on capacitor $C_2$ as:

$$V_2 = \frac{1}{2} V_g (2D-1)/(1-D) \tag{39}$$

which shows this DC voltage to be zero at duty ratio of 0.5 and changing polarity for higher and lower duty ratios. Thus a capacitor capable of withstanding either voltage polarity must be used such as ceramic capacitors, for example.

Other Extensions with Pulsating Input Current

Figure 33A:
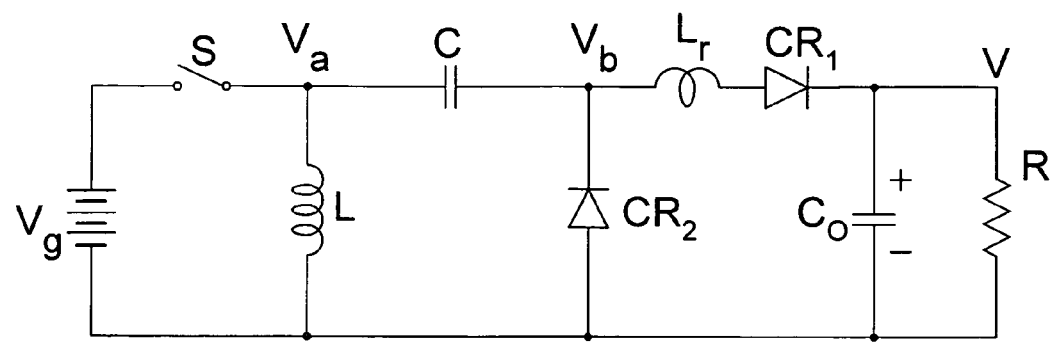
FIG. 33a illustrates non-inverting non-isolated embodiment of present invention with pulsating input current.
Figure 33B:
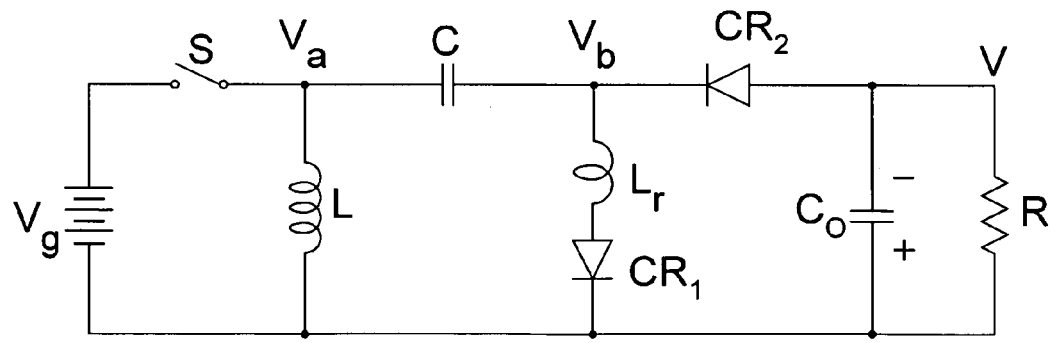
FIG. 33b illustrates inverting non-isolated embodiment with pulsating input current.
Figure 34A:
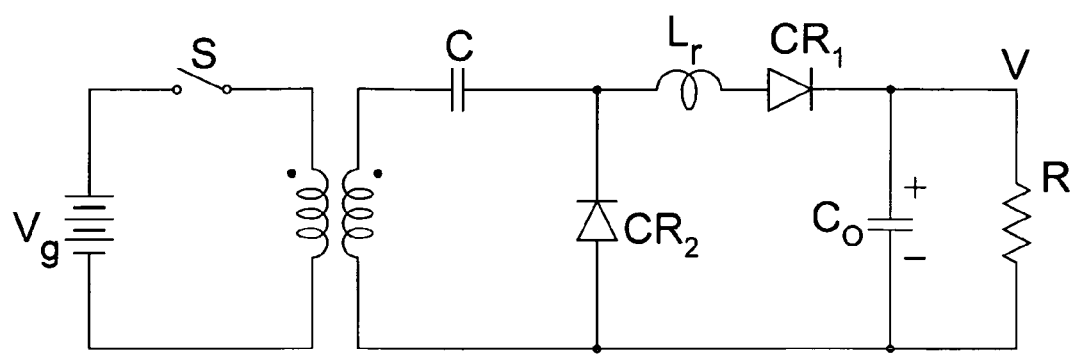
FIG. 34a illustrates an isolated extension of the converter in FIG. 33a, and FIG. 34b illustrates an isolated extension of the converter in FIG. 33b.
Figure 34B:
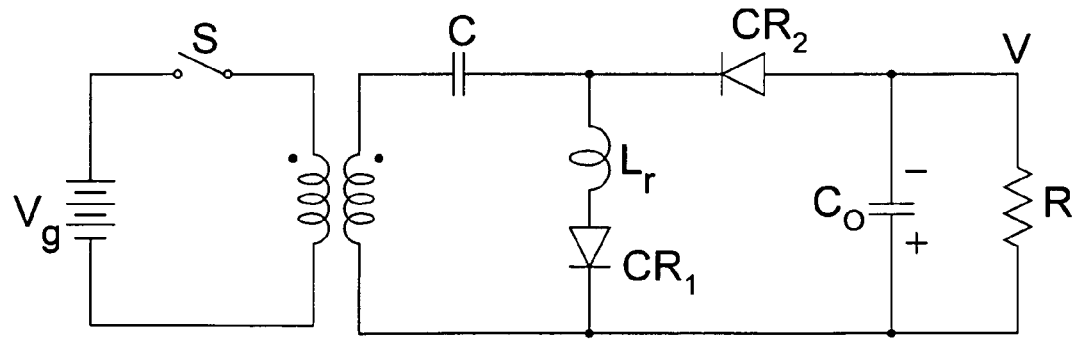

The previous non-isolated and isolated extensions of the step-up converters had an input inductor. Here several extensions are introduced in which the input inductor is relocated such as shown in FIG. 33a and FIG. 33b. Both configurations feature the resonant ON-time interval and PWM OFF-time interval. The non-isolated converters of FIG. 5a and FIG. 5b have the same complexity as the converters in FIG. 33a and FIG. 33b but have an advantage in having a continuous (non-pulsating) input current. On the other hand, the converters in FIG. 33a and FIG. 33b can be easily converted into isolated counter-parts by replacing the inductor with a two winding isolation transformer as shown in FIG. 34a and FIG. 34b, thus eliminating one inductor compared to converters on FIG. 7a and FIG. 7b. However, this isolation transformer does have a DC bias and its performance and efficiency are inferior to the isolation transformers in converters of FIG. 7a and FIG. 7b, which have no DC bias. This together with the pulsating input current as well as output pulsating current results in reduced efficiency but also reduced cost.

Half-Bridge and Full-Bridge Extensions

Figure 35A:
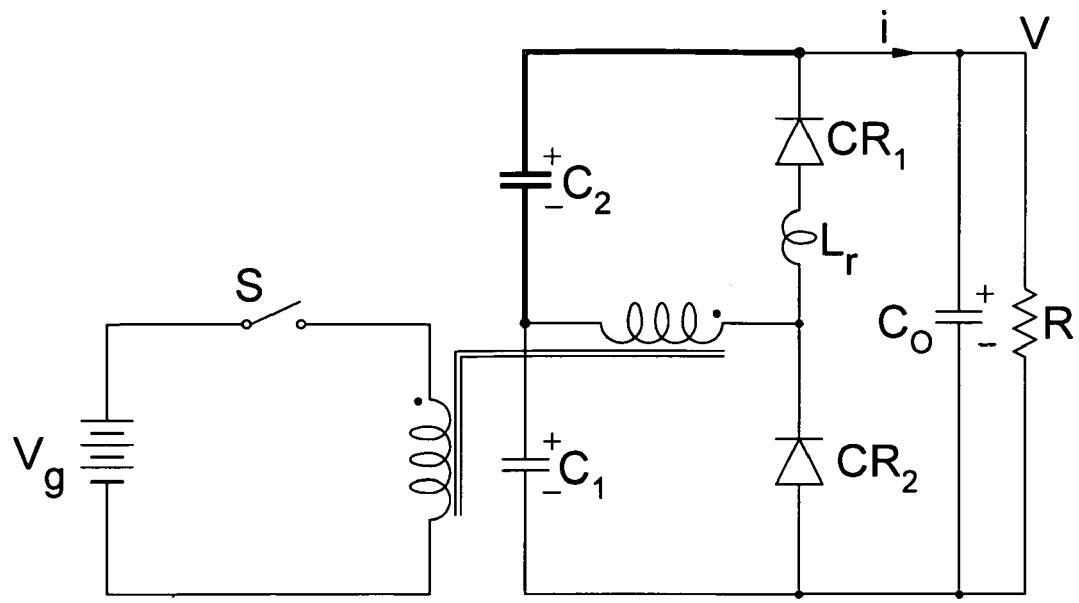
Figure 35B:
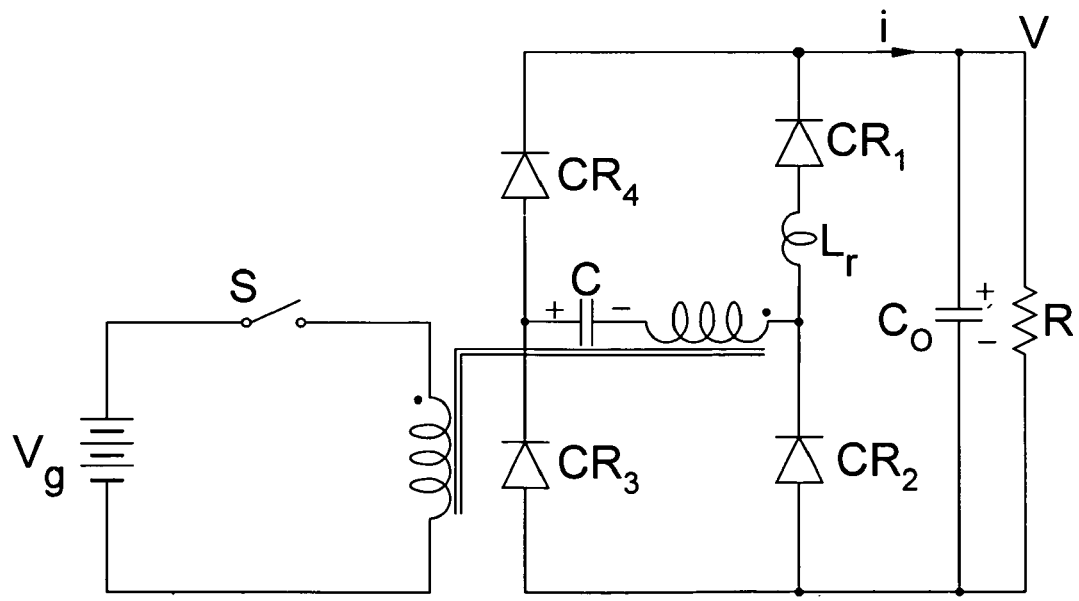

Following the same procedure as described previously, the half-bridge and full-bridge secondary side rectification can be implemented as illustrated in FIG. 35a and FIG. 35b. The same advantages as described for previous extensions apply.

AC-to-DC Step-Down Voltage Conversion

Isolation transformer could be also used with the transformer step-down turns ratio to achieve an coverall step-down voltage conversion such as in AC-DC power conversion applications.

Figure 36A:
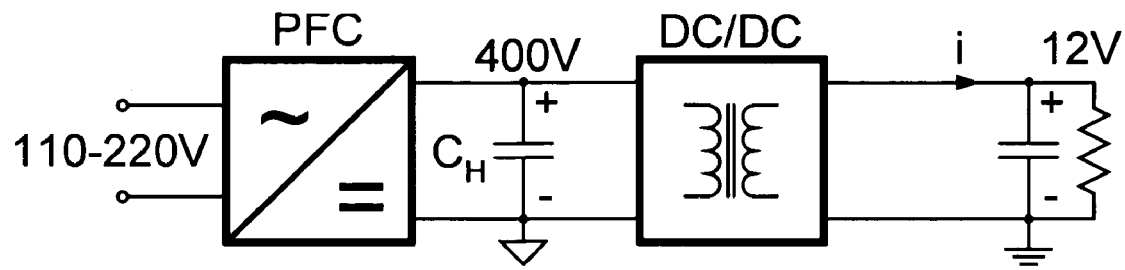
FIG. 36a illustrates use of the step-up converter in AC-DC applications with PFC front-end.
Figure 36B:
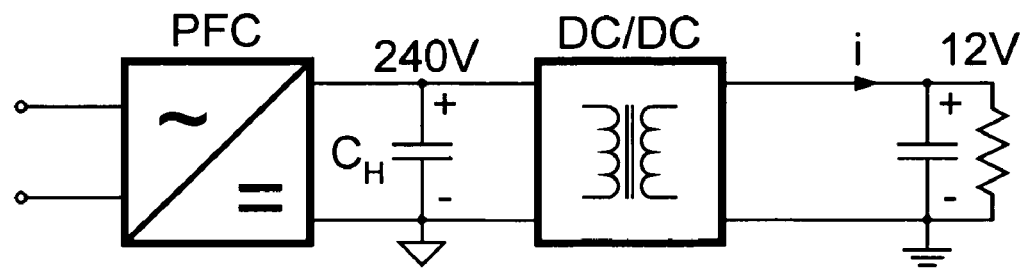
FIG. 36b illustrates default operation during short AC power failure so that voltage on hold-up capacitor $C_H$ is reduced to 100V while output is still regulated to 48V.

In many practical applications, the AC input line is first converted into an intermediate high voltage DC output by use of the Power Factor Converter operating at near unity power factor to provide the sinusoidal input AC current and in phase with input voltage for lowest harmonics and highest efficiency as shown in FIG. 36a. The intermediate high voltage 400V DC is also used to provide effective and compact capacitor energy storage during a brief AC line failures as shown in FIG. 36b so that hold-up time of 20 msec allows uninterrupted equipment operation for 20 msec, during which hold-up capacitor voltage reduces to 240V. Since PFC converter is non-isolated boost converter such as one in FIG. 2a, the isolation is required for the down-stream DC-to-DC converter. In computer server applications, the output voltage of 12V is needed as shown in FIG. 36a and FIG. 36b. In either case an efficient step-down DC-to-DC converter is needed to reduce input voltage from 400V to 48V or 12V and provide isolation at the same time.

The converter of FIG. 31a can then be operated with an effective duty ratio of D=0.5 (for a DC gain of 1). However, the transformer with a step-down turns ratio of approximately 1/33 will result in ultimate 12V output voltage. It may seem at first not logical to use a step-up converter for an overall step-down voltage conversion. However, in this application several benefits are achieved:

1. All three switches are operating with the low and limited voltage stresses: output diodes with voltage stresses limited to low output voltage and input switch limited to low output voltage divided by transformer turns ration. This would result in low conduction and lower switching losses of output switches.

2. When the AC line is interrupted, the hold up capacitor voltage may be reduced to low 240V during the hold-up time (FIG. 36b). However, the converter's step-up feature will help to keep the output voltage regulated at 12V during that short period with low input voltage. Equally important, even a wide input voltage operating range of 4:1 is possible, i.e., to operate with 100V DC input voltage, as the converter can inherently operate over wide input voltage range without a danger of switch failure due to overvoltage as in many other DC-to-DC converters.

3.

CONCLUSION

A switching converter is introduced, which features three switches only, in clear distinction to PWM switching converters whose switches come in complementary pairs, such as two, four or more. This PWM/resonant type switching converter behaves in OFF-time interval like a classical Pulse Width Modulated (PWM) switching converter, while in the ON-time features a half cycle sinusoidal resonant current resulting in the following performance characteristics:

a) ability to start-up isolated step-up converter using a built-in step-down characteristic at low duty ratios and light load;

b) polarity inverting configuration suitable for new applications;

c) simple switch realization with primary side controllable switch and two secondary side rectifiers;

d) ability to obtain high step-up of the input voltage efficiently and with minimum output filtering requirement with low rms current of the output capacitor.

The outstanding features are the best utilization of all three switches with minimum voltage stress and limited current stress such as:

a) voltage stress of two secondary side rectifier switches is equal to the output regulated DC voltage V for all operating conditions;

b) current stress of two secondary side switches is comparable to best PWM converters;

c) voltage stress of the input switch is equal to the input DC voltage for all operating conditions;

d) current stress of the primary side switch is comparable to PWM counterpart.

Best mode of operation is with resonant half period adjusted to be equal to the constant ON-time interval, while output voltage regulation is achieved by use of variable switching frequency.

REFERENCES

1. Slobodan M. Cuk, R. D. Middlebrook, "*DC-to-DC Switching Converter*", U.S. Pat. No. 4,184,197, Jan. 15, 1980;
2. Slobodan M. Cuk, "*DC-to-DC Switching Converter With Zero Input and Output Ripple and Integrated Magnetics*", U.S. Pat. No. 4,257,087, Mar. 17, 1981;
3. SEPIC converter patent and Bell paper reference;

4. Slobodan Cuk, "*Modelling, Analysis and Design of Switching Converters*", PhD thesis, November 1976, California Institute of Technology, Pasadena, Calif., USA.
5. Dragan Maksimovic, "*Synthesis of PWM and Quasi-Resonant DC-to-DC Power Converters*", PhD thesis, Jan. 12, 1989, California Institute of Technology, Pasadena, Calif., USA;
6. Vatche Vorperian, "*Resonant Converters*", PhD thesis, California Institute of technology, Pasadena, Calif.;
7. R. P. Massey and E. C. Snyder, "*High voltage Single-Ended DC-DC converter*", IEEE Power Electronics Specialists conference, 1977 record, pp. 156-159.
8. Slobodan Cuk, R. D. Middlebrook, "*Advances in Switched-Mode Power Conversion*", Vol. 1, II, and III, TESLAco 1981 and 1983.

What is claimed is:

1. A non-isolated switching DC-to-DC converter for providing power from a DC voltage source connected between an input terminal and a common terminal to a DC load connected between an output terminal and said common terminal, said converter comprising:

an input inductor connected at one end to said input terminal;

an input switch with one end connected to said common terminal and another end connected to another end of said input inductor;

a capacitor connected at one end to said another end of said input inductor;

a first current rectifier with an anode end connected to said common terminal;

a second current rectifier with an anode end connected to another end of said capacitor and a cathode end connected to said output terminal;

a resonant inductor with one end connected to a cathode end of said first current rectifier and another end connected to said anode end of said second current rectifier;

an output capacitor with one end connected to said output terminal and another end connected to said common terminal;

switching means for keeping said input switch ON for a duration of an ON-time interval $DT_S$, and keeping it OFF for an OFF-time interval $D'T_S$, where D is a duty ratio and D' is a complementary duty ratio within one complete and controlled switch operating cycle $T_S$;

wherein said input switch can be implemented with active semiconductor switching devices such as bipolar transistor or MOSFET transistor;

wherein said resonant inductor and said capacitor form a resonant circuit during said ON-time interval and define a constant resonant frequency and corresponding constant resonant period;

wherein said second rectifier turns ON when said input switch is turned OFF and said second rectifier turns OFF when said input switch is turned ON so that said input switch and said second rectifier operate out-of-phase;

wherein turn-ON of said input switch causes a turn-ON of said first rectifier at zero current level and a sinusoidal resonant current flows through said first current rectifier until it reaches a zero current level again and turns OFF said first rectifier making a conduction time interval of said first rectifier equal to half of a resonant period;

wherein said input switch is turned OFF at instant when said first rectifier turns OFF, making said ON-time interval $DT_S$ constant and equal to half said resonant period;

whereby said first rectifier is turned ON and turned OFF at zero current with no switching losses, and whereby an output voltage between said output terminal and said common terminal is regulated by controlling said OFF-time interval $D'T_S$ of said input switch;

whereby said converter in steady-state has a step-up DC conversion gain characteristics dependent on said duty ratio D;

whereby voltage stresses on said input switch, said first current rectifier, and said second current rectifier are equal to said output voltage, and whereby said output voltage has the same polarity as said DC voltage source.

2. A converter as defined in claim 1, wherein said anode end of said first rectifier is disconnected from said common terminal and connected to said output terminal;

wherein said cathode end of said second rectifier is disconnected from said output terminal and connected to said common terminal;

wherein said resonant inductor, said capacitor, and said output capacitor form a resonant circuit during said ON-time interval and define a constant resonant frequency and corresponding constant resonant period, and whereby said output voltage has the opposite polarity of said DC voltage source.

3. A converter as defined in claim 2, wherein said one end of said input inductor is disconnected from said input terminal and connected to said common terminal;

wherein said one end of said input switch is disconnected from said common terminal and connected to said input terminal;

wherein said anode end of said first rectifier is disconnected from said output terminal and connected to said one end of said resonant inductor;

wherein said cathode end of said first rectifier is disconnected from said one end of said resonant inductor and connected to said output terminal;

wherein said anode end of said second rectifier is disconnected from said another end of said resonant inductor and connected to said common terminal;

wherein said cathode end of said second rectifier is disconnected from said common terminal and connected to said another end of said resonant inductor, and whereby said output voltage has the same polarity as said DC voltage source.

4. A converter as defined in claim 3, wherein said anode end of said second rectifier is disconnected from said common terminal and connected to said output terminal;

wherein said cathode end of said first rectifier is disconnected from said output terminal and connected to said common terminal;

wherein said resonant inductor and said capacitor form a resonant circuit during said ON-time interval and define a constant resonant frequency and corresponding constant resonant period, and whereby said output voltage has the opposite polarity of said DC voltage source.

5. A converter as defined in claim 1, wherein turn-OFF of said input switch is delayed and takes place after said first rectifier turns OFF, making said ON-time interval $DT_S$ longer than a half of said resonant period, and whereby said first rectifier is turned ON and turned OFF at zero current with no switching losses.

6. A converter as defined in claim 1,
wherein said input switch is turned OFF before said first rectifier turns OFF, making said ON-time interval $DT_S$ shorter than a half of said resonant period;
whereby for very low said duty ratio D, said DC conversion gain has a step-down conversion characteristic which enables a start-up of said converter and gradual increase of said output voltage until a step-up conversion range is reached at higher duty ratios;
whereby a high peak resonant current during said start-up can be reduced by increasing a switching frequency above maximum switching frequency used for regulation in said step-up region, and
whereby said increased switching frequency is used only during said start-up to reduce said high peak resonant current stresses during said start-up of said converter.

7. An isolated switching DC-to-DC converter for providing power from a DC voltage source connected between an input terminal and a common input terminal to a DC load connected between an output terminal and a common output terminal, said converter comprising:
an isolation transformer with a primary winding and a secondary winding, each winding having one dot-marked end and another unmarked end whereby any AC voltage applied to said primary winding of said isolation transformer induces AC voltage in said secondary winding of said isolation transformer so that two AC voltages are in phase at dot-marked ends of said primary and secondary windings of said isolation transformer;
said primary winding of said isolation transformer connected at an unmarked end thereof to said common input terminal;
said secondary winding of said isolation transformer connected at an unmarked end thereof to said common output terminal;
a first capacitor connected at one end to said dot-marked end of said primary winding of said isolation transformer;
an input inductor connected at one end to said common input terminal and another end connected to said first capacitor at another end thereof;
an input switch with one end connected to said common input terminal and another end connected to said another end of said input inductor;
a second capacitor connected at one end to said dot-marked end of said secondary winding of said isolation transformer;
a first current rectifier with an anode end connected to said common output terminal;
a second current rectifier with an anode end connected to another end of said second capacitor and a cathode end connected to said output terminal;
an resonant inductor with one end connected to a cathode end of said first current rectifier and another end connected to said anode end of said second current rectifier;
an output capacitor with one end connected to said output terminal and another end connected to said common output terminal;
switching means for keeping said input switch ON for a duration of an ON-time interval $DT_S$, and keeping it OFF for an OFF-time interval $D'T_S$, where D is a duty ratio and D' is a complementary duty ratio within one complete and controlled switch operating cycle $T_S$;
wherein said isolation transformer does not have a DC-bias and does not have an air-gap;
wherein said primary winding and said secondary winding are tightly coupled for reduced leakage;
wherein said input switch can be implemented with active semiconductor switching devices such as bipolar transistor or MOSFET transistor;
wherein said resonant inductor, said first capacitor, and said second capacitor form a resonant circuit during said ON-time interval and define a constant resonant frequency and corresponding constant resonant period;
wherein said second rectifier turns ON when said input switch is turned OFF and said second rectifier turns OFF when said input switch is turned ON so that said input switch and said second rectifier operate out-of-phase;
wherein turn-ON of said input switch causes a turn-ON of said first rectifier at zero current level and a sinusoidal resonant current flows through said first current rectifier until it reaches a zero current level again and turns said first rectifier OFF making a conduction time interval of said first rectifier equal to half of a resonant period;
wherein said input switch is turned OFF at instant when said first rectifier turns OFF, making said ON-time interval $DT_S$ constant and equal to half said resonant period;
whereby said first rectifier is turned ON and turned OFF at zero current with no switching losses, and
whereby an output voltage between said output terminal and said common terminal is regulated by controlling said OFF-time interval $D'T_S$ of said input switch;
whereby said converter in steady-state has a step-up DC conversion gain characteristics dependent on said duty ratio D;
whereby a turns ratio of said secondary winding to said primary winding of said isolation transformer provides additional scaling of said DC-to-DC voltage conversion ratio of said converter;
whereby voltage stresses on said first current rectifier, and said second current rectifier are equal to said output voltage;
whereby voltage stress on said input switch is equal to said output voltage divided by said turns ration of said isolation transformer;
whereby said isolation transformer with no air-gap is small and efficient, and
whereby said output voltage has the same polarity as said DC voltage source.

8. A converter as defined in claim 7,
wherein turn-OFF of said input switch is delayed and takes place after said first rectifier turns OFF, making said ON-time interval $DT_S$ longer than a half of said resonant period, and whereby said first rectifier is turned ON and turned OFF at zero current with no switching losses.

9. A converter as defined in claim 7,
wherein said input switch is turned OFF before said first rectifier turns OFF, making said ON-time interval $DT_S$ shorter than a half of said resonant period;
whereby for very low said duty ratio D, said DC conversion gain has a step-down conversion characteristic which enables a start-up of said converter and gradual increase of said output voltage until a step-up conversion range is reached at higher duty ratios;
whereby a high peak resonant current during said start-up can be reduced by increasing a switching frequency above maximum switching frequency used for regulation in said step-up region, and
whereby said increased switching frequency is used only during said start-up to reduce said high peak resonant current stresses during said start-up of said converter.

10. A converter as defined in claim 7,
wherein said input inductor and said isolation transformer are coupled on a common magnetic UU-type magnetic core to form an Integrated Magnetics structure;
wherein said Integrated Magnetics structure has a DC bias and an air-gap is introduced in one leg of said UU-type magnetic core to prevent magnetic flux saturation;
wherein said primary winding and said secondary winding of said isolation transformer are placed on a magnetic leg with said air-gap, while said input inductor winding is placed on a magnetic leg without said air-gap, so that a ripple current of said input inductor is shifted into said isolation transformer, thus significantly reducing a conducted input noise, and
whereby said Integrated Magnetics structure is both smaller and more efficient than two separate magnetic structures of said input inductor and said isolation transformer it replaces.

11. A converter as defined in claim 7,
wherein said anode end of said first rectifier is disconnected from said common output terminal and connected to said output terminal;
wherein said cathode end of said second rectifier is disconnected from said output terminal and connected to said common output terminal;
wherein said resonant inductor, said first capacitor, said second capacitor, and said output capacitor form a resonant circuit during said ON-time interval and define a constant resonant frequency and corresponding constant resonant period, and
whereby said output voltage has the opposite polarity of said DC voltage source.

12. A converter as defined in claim 7, further including a third capacitor;
wherein said unmarked end of said secondary winding of said isolation transformer is disconnected from said common output terminal;
wherein said one end of said second capacitor is disconnected from said dot-marked end of said secondary winding of said isolation transformer and connected to said common output terminal;
wherein said another end of said second capacitor is disconnected from said anode end of said second current rectifier and connected to said unmarked end of said secondary winding of said isolation transformer;
wherein said dot-marked end of said secondary winding of said isolation transformer is connected to said anode end of said second current rectifier
wherein one end of said third capacitor is connected to said output terminal and another end of said third capacitor is connected to said unmarked end of said secondary winding of said isolation transformer;
whereby said DC load is supplied by current during both said ON-time interval $DT_S$ and said OFF-time interval $D'T_S$ to increase efficiency of said converter, and
whereby size and ripple current requirements of said output capacitor are substantially reduced.

13. A converter as defined in claim 7, further including a third current rectifier and fourth current rectifier;
wherein said unmarked end of said secondary winding of said isolation transformer is disconnected from said common output terminal;
wherein an anode end of said third current rectifier is connected to said common output terminal and a cathode end of said third current rectifier is connected to an anode end of said forth current rectifier;
wherein an cathode end of said forth current rectifier is connected to said output terminal;
wherein said dot-marked end of said secondary winding of said isolation transformer is disconnected from said one end of said second capacitor and connected to said anode end of said second current rectifier;
wherein said another end of said second capacitor is disconnected from said anode end of said second current rectifier and connected to said unmarked end of said secondary winding of said isolation transformer;
wherein said one end of said second capacitor is connected to said cathode of said third current rectifier;
whereby said DC load is supplied by current during both said ON-time interval $DT_S$ and said OFF-time interval $D'T_S$ to increase efficiency of said converter;
whereby size and ripple current requirements of said output capacitor are substantially reduced, and
whereby for said duty ratio D between 0 and 0.5, said converter has a step-down DC conversion characteristic, and for said duty ratio D between 0.5 and 1, said converter has a step-up DC conversion characteristic.

14. An isolated switching DC-to-DC converter for providing power from a DC voltage source connected between an input terminal and a common input terminal to a DC load connected between an output terminal and a common output terminal, said converter comprising:
an isolation transformer with a primary winding and a secondary winding, each winding having one dot-marked end and another unmarked end whereby any AC voltage applied to said primary winding of said isolation transformer induces AC voltage in said secondary winding of said isolation transformer so that two AC voltages are in phase at dot-marked ends of said primary and secondary windings of said isolation transformer;
said primary winding of said isolation transformer connected at an unmarked end thereof to said common input terminal;
said secondary winding of said isolation transformer connected at an unmarked end thereof to said common output terminal;
an input switch with one end connected to said input terminal and another end connected to said dot-marked end of said primary winding of said isolation transformer;
a capacitor connected at one end to said dot-marked end of said secondary winding of said isolation transformer;
a first current rectifier with a cathode end connected to said output terminal;
a second current rectifier with a cathode end connected to another end of said capacitor and an anode end connected to said common output terminal;
an resonant inductor with one end connected to an anode end of said first current rectifier and another end connected to said cathode end of said second current rectifier;
an output capacitor with one end connected to said output terminal and another end connected to said common output terminal;
switching means for keeping said input switch ON for a duration of an ON-time interval $DT_S$, and keeping it OFF for an OFF-time interval $D'T_S$, where D is a duty ratio and D' is a complementary duty ratio within one complete and controlled switch operating cycle $T_S$;
wherein said isolation transformer does not have a DC-bias and does not have an air-gap;
wherein said primary winding and said secondary winding are tightly coupled for reduced leakage;
wherein said input switch can be implemented with active semiconductor switching devices such as bipolar transistor or MOSFET transistor;
wherein said resonant inductor, said DC voltage source, said capacitor, and said output capacitor form a resonant circuit during said ON-time interval and define a constant resonant frequency and corresponding constant resonant period;

wherein said second rectifier turns ON when said input switch is turned OFF and said second rectifier turns OFF when said input switch is turned ON so that said input switch and said second rectifier operate out-of-phase;

wherein turn-ON of said input switch causes a turn-ON of said first rectifier at zero current level and a sinusoidal resonant current flows through said first current rectifier until it reaches a zero current level again and turns said first rectifier OFF making a conduction time interval of said first rectifier equal to half of a resonant period;

wherein said input switch is turned OFF at instant when said first rectifier turns OFF, making said ON-time interval $DT_S$ constant and equal to half said resonant period;

whereby said first rectifier is turned ON and turned OFF at zero current with no switching losses, and whereby an output voltage between said output terminal and said common terminal is regulated by controlling said OFF-time interval $D'T_S$ of said input switch;

whereby said converter in steady-state has a step-up DC conversion gain characteristics dependent on said duty ratio D;

whereby a turns ratio of said secondary winding to said primary winding of said isolation transformer provides additional scaling of said DC-to-DC voltage conversion ratio of said converter;

whereby voltage stresses on said first current rectifier, and said second current rectifier are equal to said output voltage;

whereby voltage stress on said input switch is equal to said output voltage divided by said turns ration of said isolation transformer;

whereby said isolation transformer with no air-gap is small and efficient, and whereby said output voltage has the same polarity as said DC voltage source.

15. A converter as defined in claim 14, wherein turn-OFF of said input switch is delayed and takes place after said first rectifier turns OFF, making said ON-time interval $DT_S$ longer than a half of said resonant period, and whereby said first rectifier is turned ON and turned OFF at zero current with no switching losses.

16. A converter as defined in claim 14, wherein said input switch is turned OFF before said first rectifier turns OFF, making said ON-time interval $DT_S$ shorter than a half of said resonant period;

whereby for very low said duty ratio D, said DC conversion gain has a step-down conversion characteristic which enables a start-up of said converter and gradual increase of said output voltage until a step-up conversion range is reached at higher duty ratios;

whereby a high peak resonant current during said start-up can be reduced by increasing a switching frequency above maximum switching frequency used for regulation in said step-up region, and whereby said increased switching frequency is used only during said start-up to reduce said high peak resonant current stresses during said start-up of said converter.

17. A converter as defined in claim 14, wherein said anode end of said second rectifier is disconnected from said common output terminal and connected to said output terminal;

wherein said cathode end of said first rectifier is disconnected from said output terminal and connected to said common output terminal;

wherein said resonant inductor, said DC voltage source, and said capacitor form a resonant circuit during said ON-time interval and define a constant resonant frequency and corresponding constant resonant period, and whereby said output voltage has the opposite polarity of said DC voltage source.

18. A converter as defined in claim 14, further including a second capacitor;

wherein said unmarked end of said secondary winding of said isolation transformer is disconnected from said common output terminal;

wherein said one end of said capacitor is disconnected from said dot-marked end of said secondary winding of said isolation transformer and connected to said common output terminal;

wherein said another end of said capacitor is disconnected from said cathode end of said second current rectifier and connected to said unmarked end of said secondary winding of said isolation transformer;

wherein said dot-marked end of said secondary winding of said isolation transformer is connected to said cathode end of said second current rectifier wherein one end of said second capacitor is connected to said output terminal and another end of said second capacitor is connected to said unmarked end of said secondary winding of said isolation transformer;

whereby said DC load is supplied by current during both said ON-time interval $DT_S$ and said OFF-time interval $D'T_S$ to increase efficiency of said converter, and whereby size and ripple current requirements of said output capacitor are substantially reduced.

19. A converter as defined in claim 14, further including a third current rectifier and fourth current rectifier;

wherein said unmarked end of said secondary winding of said isolation transformer is disconnected from said common output terminal;

wherein an anode end of said third current rectifier is connected to said common output terminal and a cathode end of said third current rectifier is connected to an anode end of said forth current rectifier;

wherein an cathode end of said forth current rectifier is connected to said output terminal;

wherein said dot-marked end of said secondary winding of said isolation transformer is disconnected from said one end of said capacitor and connected to said cathode end of said second current rectifier;

wherein said another end of said capacitor is disconnected from said cathode end of said second current rectifier and connected to said unmarked end of said secondary winding of said isolation transformer;

wherein said one end of said capacitor is connected to said cathode of said third current rectifier;

whereby said DC load is supplied by current during both said ON-time interval $DT_S$ and said OFF-time interval $D'T_S$ to increase efficiency of said converter;

whereby size and ripple current requirements of said output capacitor are substantially reduced, and whereby for said duty ratio D between 0 and 0.5, said converter has a step-down DC conversion characteristic, and for said duty ratio D between 0.5 and 1, said converter has a step-up DC conversion characteristic.

* * * * *